(12) United States Patent
Togashi et al.

(10) Patent No.: US 7,706,123 B2
(45) Date of Patent: Apr. 27, 2010

(54) MULTILAYER CAPACITOR

(75) Inventors: Masaaki Togashi, Tokyo (JP); Takeshi Wada, Tokyo (JP)

(73) Assignee: TDK Corporation, Tokyo (JP)

( * ) Notice: Subject to any disclaimer, the term of this patent is extended or adjusted under 35 U.S.C. 154(b) by 178 days.

(21) Appl. No.: 12/017,952

(22) Filed: Jan. 22, 2008

(65) Prior Publication Data

US 2008/0310074 A1    Dec. 18, 2008

(30) Foreign Application Priority Data

Feb. 2, 2007    (JP) ............................ P2007-024503

(51) Int. Cl.
*H01G 4/005* (2006.01)
*H01G 4/06* (2006.01)

(52) U.S. Cl. ...................... 361/303; 361/311
(58) Field of Classification Search ................. 361/311, 361/303–305
See application file for complete search history.

(56) References Cited

U.S. PATENT DOCUMENTS

| | | | | |
|---|---|---|---|---|
| 6,940,710 B1 * | 9/2005 | Lee et al. | ................. | 361/321.2 |
| 7,251,116 B2 * | 7/2007 | Roy | ............................ | 361/303 |
| 2003/0099083 A1 | 5/2003 | Ohtsuka et al. | | |
| 2006/0221546 A1 | 10/2006 | Togashi | | |
| 2007/0019365 A1 * | 1/2007 | Roy | ............................ | 361/303 |

FOREIGN PATENT DOCUMENTS

| | | |
|---|---|---|
| JP | A-09-148174 | 6/1997 |
| JP | A-2003-168623 | 6/2003 |
| JP | A-2004-193352 | 7/2004 |
| JP | 2005-268935 | 9/2005 |
| JP | A-2006-286930 | 10/2006 |
| JP | A-2007-43093 | 2/2007 |

* cited by examiner

*Primary Examiner*—Eric Thomas
(74) *Attorney, Agent, or Firm*—Oliff & Berridge, PLC

(57) ABSTRACT

A multilayer capacitor having a capacitor body, first and second inner electrodes, and first and second terminal electrodes. A first terminal electrode is arranged on a first surface of the capacitor body which is parallel to a first direction, and connected to the first inner electrode. A second terminal electrode is connected to the second inner electrode. The first inner electrode has a first main electrode portion including a first no-capacity generating region and a first capacity generating region, and a first lead electrode portion. In a second direction, the first terminal electrode is set smaller than the first surface, while the first lead electrode portion is set smaller than the first main electrode portion. The first no-capacity generating region and the first lead electrode portion overlap each other in the second direction when seen in the first direction.

8 Claims, 11 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a capacitor body which has a plurality of dielectric layers and a plurality of inner electrodes, and a plurality of terminal electrodes formed on the capacitor body (see, for example, Japanese Patent Application Laid-Open No. 9-148174).

SUMMARY OF THE INVENTION

It is an object of the present invention to provide a multilayer capacitor where mechanical strains due to the electrostrictive effect can be suppressed in a region near terminal electrodes of a capacitor body having a dielectric characteristic.

Meanwhile, when a voltage is applied to a multilayer capacitor equipped with a capacitor body having a dielectric characteristic, there occurs a problem that a mechanical strain having a magnitude proportional to the applied voltage is caused in the capacitor body because of the electrostrictive effect. When an AC voltage is applied, a vibration occurs in the multilayer capacitor in particular. If such a mechanical strain is generated when the multilayer capacitor is mounted on a board or the like, sounding will occur in the board due to the propagation of vibrations caused by the strain.

Therefore, the inventors conducted diligent studies about how to reduce the sounding occurring when mounting the multilayer capacitor to boards and the like. As a result, the inventors have found that the sounding occurs at the contact portion between the board or the like to which the multilayer capacitor is mounted and the multilayer capacitor, i.e., the contact portion between a land electrode or the like of the board and a terminal electrode of the multilayer capacitor. The inventors conducted further studies based on this discovery and, as a result, have found a new fact that suppressing the electric field (i.e., suppressing the voltage) applied to a region in the vicinity of a terminal electrode in the capacitor body can restrain the mechanical strain of the capacitor body due to the electrostrictive effect from affecting the terminal electrode.

In view of these results of studies, the present invention provides a multilayer capacitor comprising: a capacitor body having a dielectric characteristic; first and second inner electrodes arranged in the capacitor body so as to oppose each other in a first direction with at least portion of the capacitor body therebetween; a first terminal electrode arranged on a first surface out of outer surfaces of the capacitor body and connected to the first inner electrode, the first surface being parallel to the first direction; and a second terminal electrode arranged on an outer surface of the capacitor body and connected to the second inner electrode; wherein the first inner electrode has a first main electrode portion including a first no-capacity generating region noncontributory to generating a capacitance and a first capacity generating region cooperating with the second inner electrode so as to generate a capacitance, and a first lead electrode portion connecting the first main electrode portion to the first terminal electrode; wherein, in a second direction parallel to the first surface and orthogonal to the first direction, the first terminal electrode has a length set smaller than that of the first surface, while the first lead electrode portion has a length set smaller than that of the first main electrode portion; and wherein the first no-capacity generating region and the first lead electrode portion overlap each other in the second direction when seen in the first direction.

In the multilayer capacitor in accordance with the present invention, the first main electrode portion of the first inner electrode includes a first no-capacity generating region, while the first no-capacity generating region is arranged at such a position as to overlap the first lead electrode portion in the second direction when seen in the first direction. The electrostrictive effect occurs in a dielectric region where a voltage is applied. Therefore, the effect of electrostriction affecting the first lead electrode portion is reduced in proportion to the first no-capacity generating region. This lowers the influence on the first terminal electrode caused by the electrostrictive effect of the capacitor body, whereby the multilayer capacitor can suppress the mechanical strain caused by the electrostrictive effect near the first terminal electrode. Also, in this multilayer capacitor, the length of the first terminal electrode is set smaller than that of the first surface in the second direction. Consequently, even if the first terminal electrode is pulled by the capacitor body distorted by the electrostrictive effect, the region influencing a board or the like mounting the capacitor can be reduced. Further, the length of the first lead electrode portion connecting with the first terminal electrode is set smaller than that of the first main electrode portion in the second direction. This can reduce the length of the first terminal electrode in the second direction.

Preferably, the first main electrode portion and the first lead electrode portion are in contact with each other in the first inner electrode; and wherein the first no-capacity generating region is arranged so as to come into contact with a boundary portion between the first main electrode portion and the first lead electrode portion. As the first no-capacity generating region is nearer to the first lead electrode portion, the influence on the first terminal electrode caused by the electrostrictive effect of the capacitor body becomes smaller. As a result, the mechanical strain caused by the electrostrictive effect can be further suppressed in a region near the first terminal electrode in this multilayer capacitor.

The first no-capacity generating region may be formed like an opening in the first main electrode portion of the first inner electrode. Alternatively, the first no-capacity generating region may be formed like a slit in the first main electrode portion of the first inner electrode.

Preferably, the second terminal electrode is arranged on a second surface parallel to the first direction out of the outer surfaces of the capacitor body, wherein the second inner electrode has a second main electrode portion including a second no-capacity generating region noncontributory to generating a capacitance and a second capacity generating region cooperating with the first inner electrode so as to generate a capacitance, and a second lead electrode portion connecting the second main electrode portion to the second terminal electrode; wherein, in a third direction parallel to the second surface and orthogonal to the first direction, the second terminal electrode has a length set smaller than that of the second surface, while the second lead electrode portion of the second inner electrode has a length set smaller than that of the second main electrode portion of the second inner electrode; and wherein the second no-capacity generating region of the second inner electrode and the second lead electrode portion of the second inner electrode overlap each other in the third direction when seen in the first direction.

In this case, the influence on the second terminal electrode caused by the electrostrictive effect of the capacitor body is also suppressed, whereby the mechanical strain due to the electrostrictive effect can be suppressed not only in the vicinity of the first terminal electrode but also in the vicinity of the second terminal electrode.

Preferably, in this case, the first and second inner electrodes are arranged such that the first no-capacity generating region of the first inner electrode and the second no-capacity generating region of the second inner electrode oppose each other with the at least portion of the capacitor body therebetween.

When the no-capacity generating region of one inner electrode thus opposes the no-capacity generating region of the other inner electrode, the capacitance of the multilayer capacitor can efficiently be restrained from decreasing.

Preferably, a plurality of first inner electrodes and a plurality of second inner electrodes are alternately arranged along the first direction; and wherein the ratio of the length of the first terminal electrode in the second direction to the distance between an outermost inner electrode in the first direction in the first and second inner electrodes and the outer surface of the capacitor body opposing the outermost inner electrode is greater than 0.4 but smaller than 8.0.

In the capacitor body in this case, the first and second inner electrodes apply no voltage to the region between the outermost inner electrode in the first direction and the outer surface of the capacitor body opposing the outermost inner electrode. Therefore, no electrostrictive effect due to the voltage applied by the first and second inner electrodes occurs in this region. Also, the relationship between the distance from the outermost inner electrode in the first direction to the outer surface of the capacitor body opposing the inner electrode and the length of the first terminal electrode in the second direction is defined by a ratio. Therefore, the mechanical strain of the multilayer capacitor can favorably be kept from propagating to a mounting board and the like.

The present invention can provide a multilayer capacitor where mechanical strains caused by the electrostrictive effect can be suppressed in a region near terminal electrodes of a capacitor body having a dielectric characteristic.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments will be explained in detail with reference to the accompanying drawings. In the explanation, the same constituents or those having the same functions will be referred to with the same numerals or letters while omitting their overlapping descriptions.

First Embodiment

Figure 1:
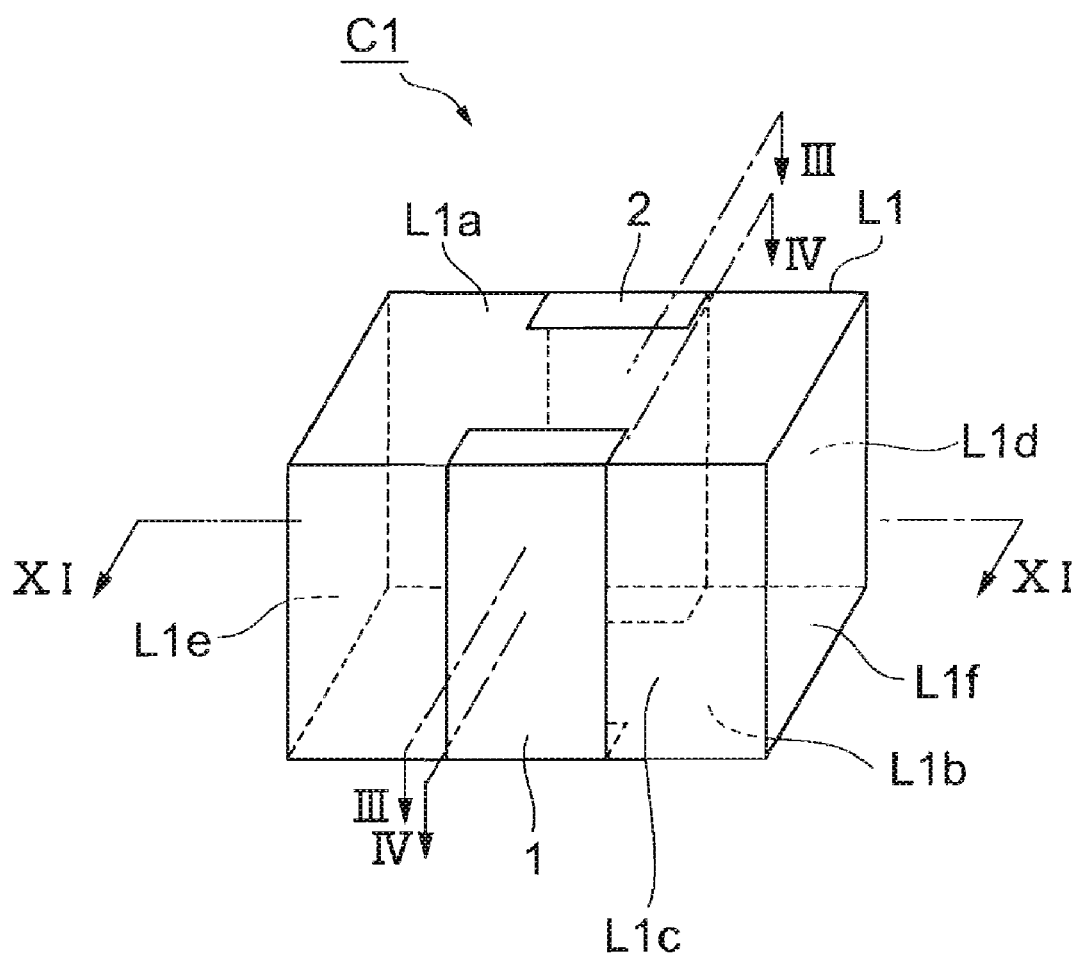
FIG. 1 is a perspective view of the multilayer capacitor in accordance with the first embodiment.
Figure 2:
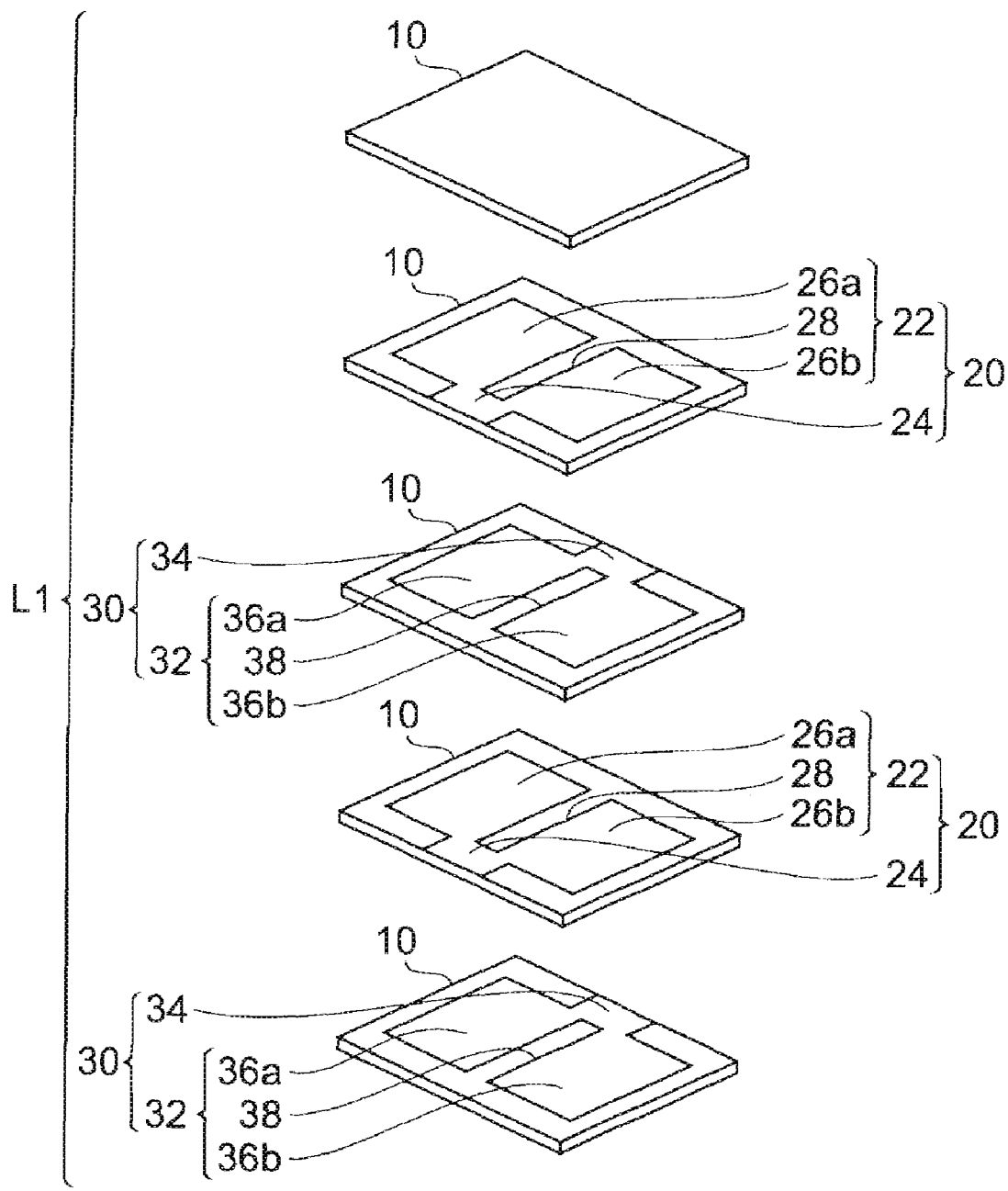
FIG. 2 is an exploded perspective view of the capacitor body included in the multilayer capacitor in accordance with the first embodiment.
Figure 3:
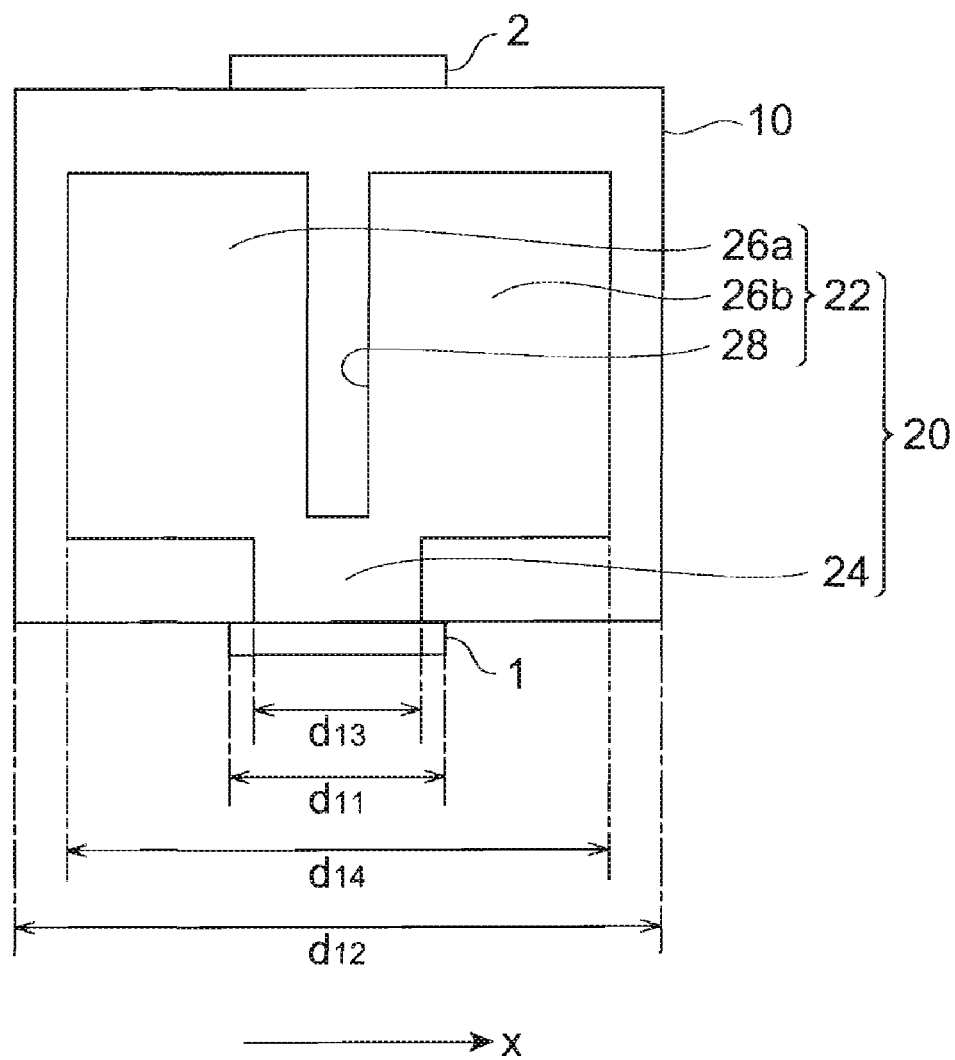
FIG. 3 is a view for explaining a cross-sectional structure of the multilayer capacitor in accordance with the first embodiment.
Figure 4:
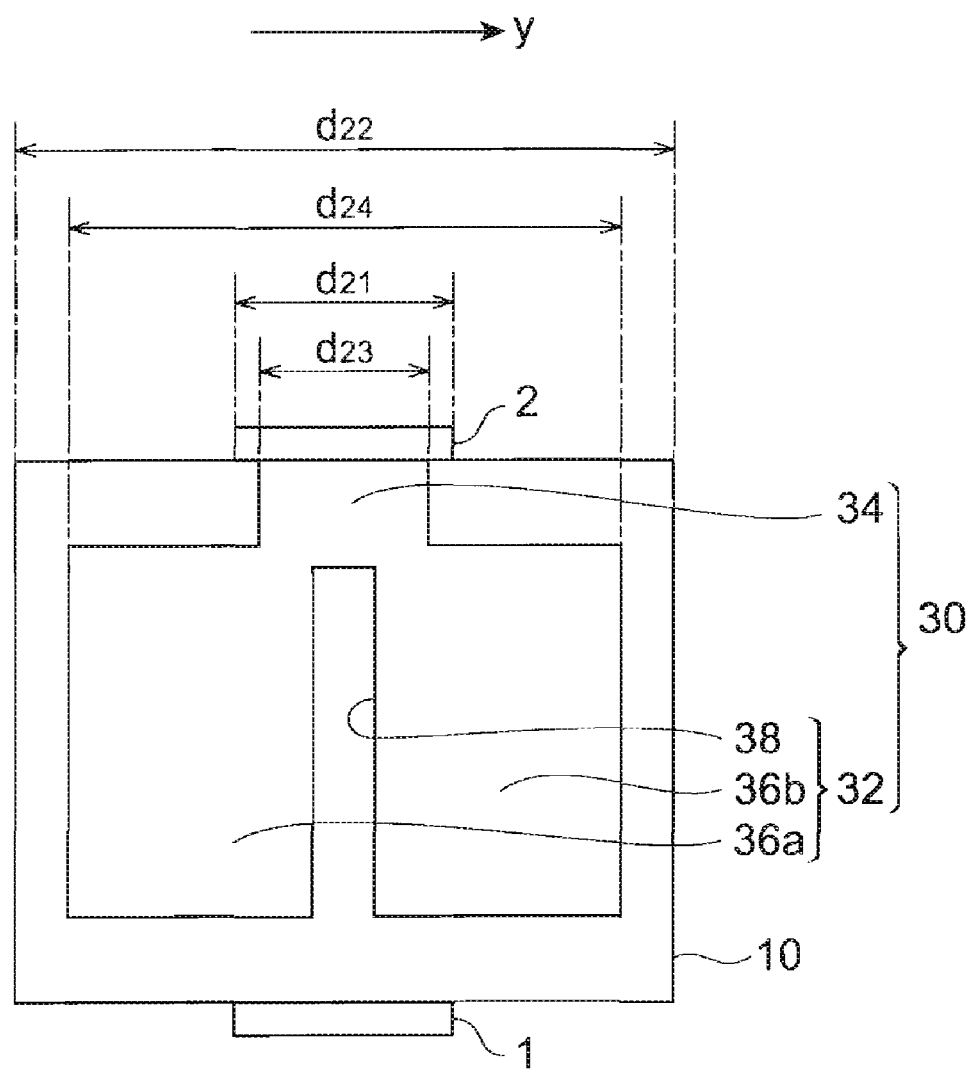
FIG. 4 is a view for explaining a cross-sectional structure of the multilayer capacitor in accordance with the first embodiment.
Figure 11:
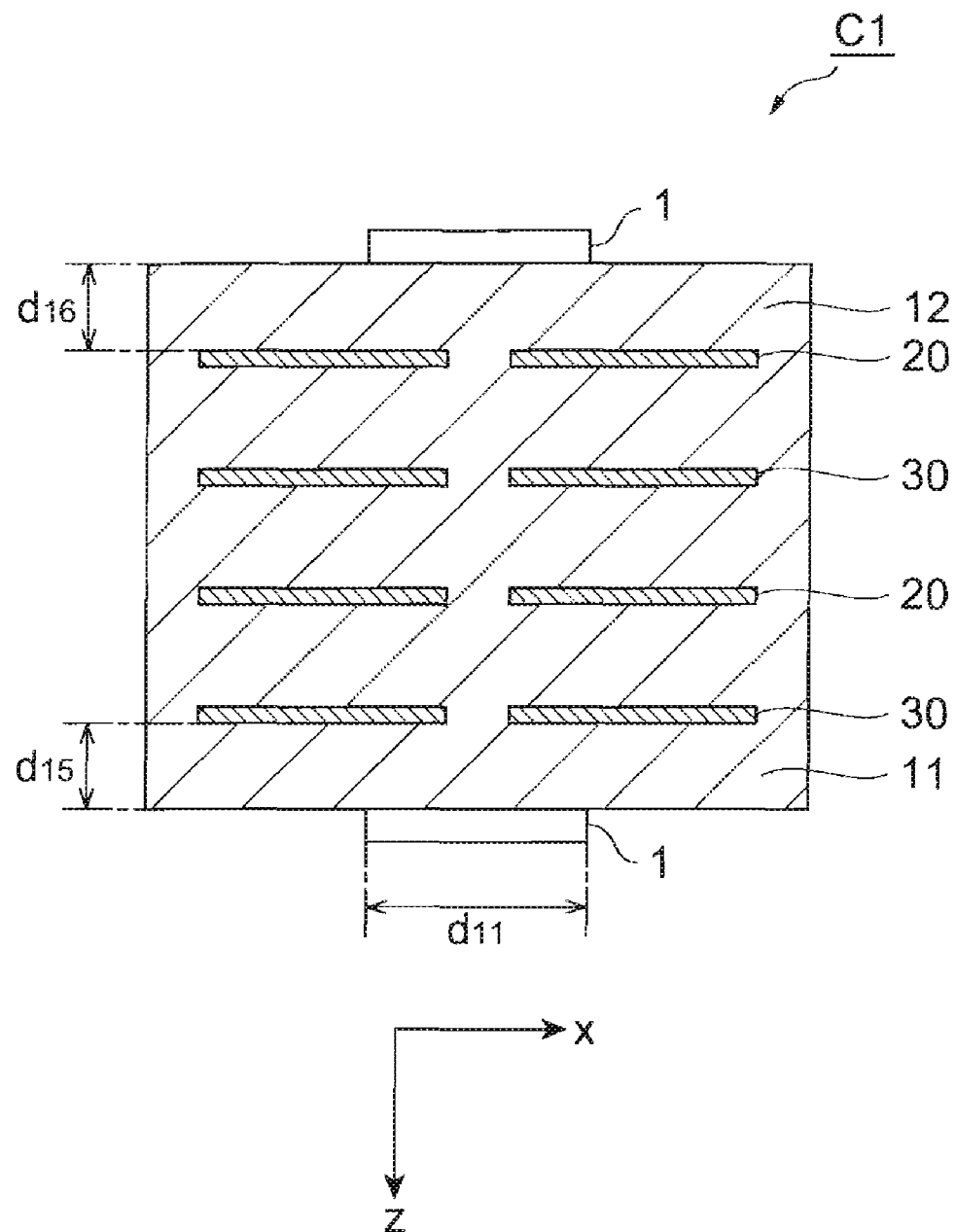
FIG. 11 is a view for explaining a cross-sectional structure of the multilayer capacitor in accordance with the first embodiment.

With reference to FIGS. 1 to 4 and 11, the structure of the multilayer capacitor C1 in accordance with the first embodiment will be explained. FIG. 1 is a perspective view of the multilayer capacitor in accordance with the first embodiment. FIG. 2 is an exploded perspective view of the capacitor body included in the multilayer capacitor in accordance with this embodiment. FIG. 3 is a view for explaining a cross-sectional structure of the multilayer capacitor in accordance with this embodiment. FIG. 4 is a view for explaining a cross-sectional structure of the multilayer capacitor in accordance with this embodiment. FIG. 11 is a view for explaining a cross-sectional structure of the multilayer capacitor in accordance with this embodiment. The cross-sectional hatching is omitted in FIGS. 3 and 4.

As shown in FIG. 1, the multilayer capacitor C1 comprises a rectangular parallelepiped capacitor body L1, and a first terminal electrode 1 and a second terminal electrode 2 which are arranged on outer surfaces of the capacitor body L1. The capacitor body L1 includes rectangular first and second main faces L1a, L1b opposing each other, first and second side faces (first and second surfaces) L1c, L1d opposing each other, and third and fourth side faces L1e, L1f opposing each other. The first and second side faces L1c, L1d extend in the longer-side direction of the first and second main faces L1a, L1b so as to connect the first and second main faces L1a, L1b to each other. The third and fourth side faces L1e, L1f extend in the shorter-side direction of the first and second main faces L1a, L1b so as to connect the first and second main faces L1a, L1b to each other.

The first terminal electrode 1 is arranged on the first side face L1c of the capacitor body L1. The second terminal electrode 2 is arranged on the second side face L1d of the capacitor body L1. The first and second terminal electrodes 1, 2 are formed, for example, by attaching and burning a conductive paste, which contains a conductive metal powder and a glass frit, onto outer surfaces of the capacitor body L1. A plating layer may be formed on the burned electrodes when necessary.

As shown in FIG. 2, the capacitor body L1 has a plurality (5 layers in this embodiment) of dielectric layers 10, a plurality (2 layers in this embodiment) of first inner electrodes 20, and a plurality (2 layers in this embodiment) of second inner electrodes 30. Therefore, the capacitor body L1, has a dielectric characteristic.

The dielectric layers 10 extend in directions parallel to the first and second main faces L1a, L1b and are laminated in the direction in which the first and second main faces L1a, L1b oppose each other. Each dielectric layer 10 is constituted by a ceramic green sheet containing a dielectric ceramic, for example. In the actual multilayer capacitor C1, the dielectric layers 10 are integrated to such an extent that their boundaries are indiscernible.

Each pair of the first inner electrode 20 and second inner electrode 30 are arranged such as to oppose each other in a first direction with one dielectric layer 10 therebetween, which is a portion of the capacitor body L1. Namely, in the capacitor body L1, the first inner electrodes 20 and second inner electrodes 30 are alternately arranged in the laminating direction of the dielectric layers 10, i.e., the opposing direction of the first and second main faces L1a, L1b, with the dielectric layers 10 therebetween.

Therefore, the first side face L1e where the first terminal electrode 1 is arranged and the second side face L1d where the second terminal electrode 2 is arranged are parallel to the direction in which the first and second inner electrodes 20, 30 oppose each other, i.e., the first direction.

Each first inner electrode 20 includes a main electrode portion 22 and a lead electrode portion 24. The main electrode portion 22 includes capacity generating regions 26a, 26b and a no-capacity generating region 28. The first inner electrode 20 is constituted by a sintered body of a conductive paste.

The capacity generating regions 26a, 26b, each having a rectangular form, are arranged in a row along the longer-side direction of the first and second main faces L1a, L1b.

In the main electrode portion 22, the no-capacity generating region 28 is formed like a slit extending from the second side face L1d side to the first side face L1c side and separating the capacity generating regions 26a, 26b from each other. The no-capacity generating region 28 is positioned near the center of the main electrode portion 22 in the longer-side direction of the first and second main faces L1a, L1b. The slit-shaped no-capacity generating region 28 is free from the sintered body of the conductive paste and does not contribute to generating a capacitance.

The lead electrode portion 24 extends from the main electrode portion 22 so as to reach the first side face L1c. The lead electrode portion 24 is connected to the first terminal electrode 1 electrically and physically. Consequently, not only the main electrode portion 22 but also the first inner electrode 20 is electrically connected to the first terminal electrode 1.

The lead electrode portion 24 is in contact with all of the capacity generating regions 26a, 26b and no-capacity generating region 28 of the main electrode portion 22. The no-capacity generating region 28 is arranged such as to come into contact with the boundary portion between the lead electrode portion 24 and the capacity generating regions 26a, 26b in the main electrode portion 22.

Each second inner electrode 30 includes a main electrode portion 32 and a lead electrode portion 34. The main electrode portion 32 includes capacity generating regions 36a, 36b and a no-capacity generating region 38. The second inner electrode 30 is constituted by a sintered body of a conductive paste.

The capacity generating regions 36a, 36b, each having a rectangular form, are arranged in a row along the longer-side direction of the first and second main faces L1a, L1b.

In the main electrode portion 32, the no-capacity generating region 38 is formed like a slit extending from the first side face L1c side to the second side face L1d side and separating the capacity generating regions 36a, 36b from each other. The no-capacity generating region 38 is positioned near the center of the main electrode portion 32 in the longer-side direction of the first and second main faces L1a, L1b. The slit-shaped no-capacity generating region 38 is free from the sintered body of the conductive paste and does not contribute to generating a capacitance.

The lead electrode portion 34 extends from the main electrode portion 32 so as to reach the second side face L1d. The lead electrode portion 34 is connected to the second terminal electrode 2 electrically and physically. Consequently, not only the main electrode portion 32 but also the second inner electrode 30 is electrically connected to the second terminal electrode 2.

The lead electrode portion 34 is in contact with all of the capacity generating regions 36a, 36b and no-capacity generating region 38 of the main electrode portion 32. The no-capacity generating region 38 is arranged such as to come into contact with the boundary portion between the lead electrode portion 34 and the capacity generating regions 36a, 36b in the main electrode portion 32.

Each pair of the first and second inner electrodes 20, 30 are arranged such that the capacity generating regions 26a, 26b of the first inner electrode 20 oppose the capacity generating regions 36a, 36b of the second inner electrode 30, respectively, with one dielectric layer 10 therebetween, which is at least portion of the capacitor body L1. Therefore, the capacity generating regions 26a, 26b of the first inner electrode 20 cooperate with the capacity generating regions 36a, 36b of the second inner electrode 30, so as to generate a capacitance.

Further, each pair of the first and second inner electrodes 20, 30 are arranged such that the no-capacity generating region 28 of the first inner electrode 20 and the no-capacity generating region 38 of the second inner electrode 30 oppose each other, with one dielectric layer 10 therebetween, which is at least portion of the capacitor body L1.

A direction parallel to the first side face 11e and orthogonal to the first direction will now be referred to as a second direction. In FIG. 3, the second direction is represented as x direction. FIG. 3 is a view schematically showing a cross section of the multilayer capacitor taken along the line III-III of FIG. 1, cut at a position where the upper face of the first inner electrode 20 and the dielectric layer 10 are laminated.

As shown in FIG. 3, the length $d_{11}$ of the first terminal electrode 1 in the second direction is set smaller than the length $d_{12}$ of the first side face L1e in the second direction. Namely, $d_{11} < d_{12}$. Further, as shown in FIG. 3, the length $d_{13}$ of the lead electrode portion 24 of the first inner electrode 20 in the second direction is set smaller than the length $d_{14}$ of the main electrode portion 22 of the first inner electrode 20 in the second direction. Namely, $d_{13} < d_{14}$. Also, $d_{13} < d_{11} < d_{14} < d_{12}$ in this embodiment.

In the first inner electrode 20, positions of the no-capacity generating region 28 and lead electrode portion 24 are set such that the no-capacity generating region 28 and lead electrode portion 24 overlap each other in the second direction (x direction) when seen in the first direction, i.e., in the cross-sectional view of FIG. 3.

A direction parallel to the second side face L1d and orthogonal to the first direction will now be referred to as a third direction. In FIG. 4, the third direction is represented as y direction. FIG. 4 is a view schematically showing a cross section of the multilayer capacitor taken along the line IV-IV of FIG. 1, cut at a position where the upper face of the second inner electrode 30 and the dielectric layer 10 are laminated. As shown in FIG. 4, the length $d_{21}$ of the second terminal electrode 2 in the third direction is set smaller than the length $d_{22}$ of the second side face L1$d$ in the third direction. Namely, $d_{21}<d_{22}$. Further, as shown in FIG. 4, the length $d_{23}$ of the lead electrode portion 34 of the second inner electrode 30 in the third direction is set smaller than the length $d_{24}$ of the main electrode portion 32 of the second inner electrode 30 in the third direction. Namely, $d_{23}<d_{24}$. Also, $d_{23}<d_{21}<d_{24}<d_{22}$ in this embodiment.

In the second inner electrode 30, positions of the no-capacity generating region 38 and lead electrode portion 34 are set such that the no-capacity generating region 38 and lead electrode portion 34 overlap each other in the third direction (y direction) when seen in the first direction, i.e., in the cross-sectional view of FIG. 4.

FIG. 11 is a cross-sectional view of the multilayer capacitor taken along the line XI-XI of FIG. 1. The capacitor body L1 has first and second outer portions 11, 12 on the outside of a plurality of first and second inner electrodes 20, 30 in the first direction. The first outer portion 11 is positioned on the second main face L1$b$ side in the first direction. The second outer portion 12 is positioned on the first main face L1$a$ side in the first direction.

Specifically, in the capacitor body L1, the first outer portion 11 corresponds to a region extending from the position of the second inner electrode 30 closest to the second main face L1$b$ in the plurality of first and second inner electrodes 20, 30 in the first direction to the second main face L1$b$. Therefore, the length of the first outer portion 11 in the first direction corresponds to the distance $d_{15}$ from the second inner electrode 30, which is the outermost inner electrode on the second main face L1$b$ side in the plurality of first and second inner electrodes 20, 30 in the first direction, to the second main face L1$b$, which is the outer surface of the capacitor body L1 opposing this second inner electrode 30.

In the multilayer capacitor C1, the ratio of the length $d_{11}$ of the first terminal electrode 1 in the second direction (x direction in FIG. 11) to the length $d_{15}$ of the first outer portion 11 in the first direction is eater than 0.4 but smaller than 8.0. Namely, the relationship represented by the following expression (1) holds.

$$0.4<d_{11}/d_{15}<8.0 \qquad (1)$$

In the capacitor body L1, the second outer portion 12 corresponds to a region extending from the position of the first inner electrode 20 closest to the first main face L1$a$ in the plurality of first and second inner electrodes 20, 30 in the first direction to the first main face L1$a$. Therefore, the length of the second outer portion 12 in the first direction corresponds to the distance $d_{16}$ from the first inner electrode 20, which is the outermost inner electrode on the first main face L1$a$ side in the plurality of first and second inner electrodes 20, 30 in the first direction, to the first main face L1$a$, which is the outer surface of the capacitor body L1 opposing this first inner electrode 20.

In the multilayer capacitor C1, the ratio of the length $d_{11}$ of the first terminal electrode 1 in the second direction (x direction in FIG. 11) to the length $d_{16}$ of the second outer portion 12 in the first direction is greater than 0.4 but smaller than 8.0. Namely, the relationship represented by the following expression (2) holds.

$$0.4<d_{11}/d_{16}<8.0 \qquad (2)$$

In the multilayer capacitor C1, the main electrode portion 22 of the first inner electrode 20 includes the no-capacity generating region 28. The electrostrictive effect occurs in a dielectric region where a voltage is applied. Therefore, even when a voltage is applied to the multilayer capacitor by connecting the terminal electrodes 1, 2 to land electrodes or the like of a board, so that the voltage is applied between the first and second inner electrodes 20, 30, the voltage imparted to the slit-shaped no-capacity generating region 28 in the main electrode portion 22 is suppressed. In addition, the no-capacity generating region 28 is arranged at such a position as to overlap the lead electrode portion 24 in the second direction (x direction in FIG. 3) when seen in the first direction. As can be understood from the foregoing, the effect of electrostriction of the capacitor body L1 affecting the lead electrode portion 24 is reduced in proportion to the no-capacity generating region 28. This lowers the influence on the first terminal electrode 1 caused by the electrostrictive effect of the capacitor body L1, whereby the multilayer capacitor C1 can suppress the mechanical strain caused by the electrostrictive effect near the first terminal electrode 1.

In the multilayer capacitor C1, the main electrode portion 32 of the second inner electrode 30 also includes the no-capacity generating region 38, which is arranged at such a position as to overlap the lead electrode portion 34 in the third direction (y direction in FIG. 4) when seen in the first direction. This lowers the influence on the second terminal electrode 2 caused by the electrostrictive effect of the capacitor body L1, whereby the multilayer capacitor C1 can suppress the mechanical strain caused by the electrostrictive effect near the second terminal electrode 2.

Therefore, even when a voltage is applied to the multilayer capacitor C1 mounted on a board or the like, the sounding occurring in the board or the like is suppressed.

As the no-capacity generating region is nearer to a lead electrode portion, the influence on a terminal electrode caused by the electrostrictive effect of the capacitor body becomes smaller. In the first inner electrode 20 in the multilayer capacitor C1, the main electrode portion 22 and lead electrode portion 24 are in contact with each other, while the no-capacity generating region 28 is arranged such as to come into contact with the boundary portion between the main electrode portion 22 and lead electrode portion 24. Therefore, the multilayer capacitor C1 can further suppress the mechanical strain caused by the electrostrictive effect near the first terminal electrode 1.

Further in the second inner electrode 30 in the multilayer capacitor C1, the main electrode portion 32 and lead electrode portion 34 are in contact with each other, while the no-capacity generating region 38 is arranged such as to come into contact with the boundary portion between the main electrode portion 32 and lead electrode portion 34. Therefore, the multilayer capacitor C1 can further suppress the mechanical strain caused by the electrostrictive effect near the second terminal electrode 2 as well.

In the multilayer capacitor C1, the first and second inner electrodes 20, 30 are arranged such that the no-capacity generating region 28 of the first inner electrode 20 and the no-capacity generating region 38 of the second inner electrode 30 oppose each other with the dielectric layer 10 therebetween. If a no-capacity generating region opposes a capacity generating region, the portion of the no-capacity generating region opposing the capacity generating region will fail to contribute to generating a capacitance. Therefore, the capacitance of the multilayer capacitor C1 can efficiently be restrained from decreasing if the no-capacity generating regions 28, 38 of the inner electrodes 20, oppose each other as in the multilayer capacitor C1.

In addition, when the dielectric layers 10 are made of sintered bodies of ceramic green sheets while the inner electrodes 20, 30 are made of sintered bodies of a conductive paste, the degree of adhesion becomes higher in locations where the dielectric layers 10 are laminated together than where the dielectric layers 10 are laminated with the inner electrodes 20, 30. Therefore, in the multilayer capacitor C1 in which the no-capacity generating regions 28, 38 are formed such as to expose the dielectric layers 10, the interlayer adhesion between the first and second inner electrodes 20, 30 and the dielectric layers 10 becomes favorable since the no-capacity generating regions 28, 38 are laminated such as to oppose each other.

Enhancing the interlayer adhesion in the capacitor body L1 suppresses the transmission of mechanical strains therein. Therefore, the multilayer capacitor C1 can restrain the whole capacitor body L1 from being mechanically strained and further suppress the mechanical strains near the first and second terminal electrodes 1, 2.

In the multilayer capacitor C1, the length $d_{11}$ of the first terminal electrode 1 is set smaller than the length $d_{12}$ of the first side face L1c in the second direction. Therefore, even if the first terminal electrode 1 is pulled by the capacitor body L1 distorted by the electrostrictive effect, the region affecting the board or the like mounting the multilayer capacitor C1 can be reduced.

Also, in the multilayer capacitor C1, the length $d_{13}$ of the lead electrode portion 24 connecting with the first terminal electrode 1 is set smaller than the length $d_{14}$ of the main electrode portion 22 in the second direction. This can reduce the length $d_{11}$ of the first terminal electrode 1 in the second direction.

Further, in the multilayer capacitor C1, the length $d_{21}$ of the second terminal electrode 2 is set smaller than the length $d_{22}$ of the second side face L1d in the third direction. Therefore, even if the second terminal electrode 2 is pulled by the capacitor body L1 distorted by the electrostrictive effect, the region affecting the board or the like mounting the multilayer capacitor C1 can be reduced.

Also, in the multilayer capacitor C1, the length $d_{23}$ of the lead electrode portion 34 connecting with the second terminal electrode 2 is set smaller than the length $d_{24}$ of the main electrode portion 32 in the third direction. This can reduce the length $d_{21}$ of the second terminal electrode 2 in the third direction.

In the multilayer capacitor C1, the first outer portion 11 is positioned on the outside of a plurality of first and second inner electrodes 20, 30 included in the capacitor body L1. Therefore, the first and second inner electrodes 20, 30 apply no voltage to the first outer portion 11. Consequently, no electrostrictive effect due to the voltage applied by the first and second inner electrodes occurs in the first outer portion 11. Also, the multilayer capacitor C1 secures such length $d_{15}$ of the first outer portion 11 as to satisfy the expression (1) (i.e., $d_{11}/d_{15}<8.0$). Thus, the multilayer capacitor C1 has the first outer portion 11 with a length sufficient for absorbing vibrations caused by the electrostrictive effect between the first and second outer portions 11, 12. Therefore, even when mounting the multilayer capacitor C1 to a board or the like such that the second main face L1b comes into contact with the board or the like, for example, the influence of the electrostrictive effect of the capacitor body L1 due to the voltage applied by the first and second inner electrodes 20, 30 is favorably restrained from propagating to the mounting board or the like. Hence, even when a voltage is applied to the multilayer capacitor C1 mounted on the board or the like, the sounding occurring in the board or the like is favorably suppressed.

In the multilayer capacitor C1, the length $d_{11}$ of the first terminal electrode 1 in the second direction is defined such that $d_{11}/d_{15}<8.0$. Therefore, even if the first terminal electrode 1 is pulled by the capacitor body L1 distorted by the electrostrictive effect, the region affecting the board or the like mounting the multilayer capacitor C1 can be reduced. As a result, even when vibrated and so forth under the influence of electrostrictive effect, the multilayer capacitor C1 favorably restrains the vibration from being transmitted to the mounting board or the like.

In addition, the length $d_{11}$ of the first terminal electrode 1 in the second direction is defined such that $d_{11}/d_{15}>0.4$ in the multilayer capacitor C1. Therefore, the multilayer capacitor C1 can realize a favorable connection between the first terminal electrode 1 and a board or the like, while restraining the influence of the electrostrictive effect occurring in the multilayer capacitor C1 from propagating to the mounting board or the like. This allows the multilayer capacitor C1 to inhibit connection failures from occurring between the first terminal electrode 1 and the mounting board or the like.

Since the size of a multilayer capacitor is defined by a standard in general, its capacitance decreases as the size of the outer portion including no inner electrode increases. In the multilayer capacitor C1, by contrast, the length $d_{15}$ of the first outer portion 11 in the first direction is defined such that $d_{11}/d_{15}>0.4$. Therefore, the multilayer capacitor C1 favorably restrains the capacitance from being reduced by the size of the first outer portion 11.

In the multilayer capacitor C1, the second outer portion 12 is positioned on the outside of a plurality of first and second inner electrodes 20, 30 included in the capacitor body L1. Therefore, the first and second inner electrodes 20, 30 apply no voltage to the second outer portion 12. Consequently, the occurrence of electrostrictive effect is suppressed in the second outer portion 12. The multilayer capacitor C1 secures such length $d_{16}$ of the second outer portion 12 as to satisfy the expression (2) (i.e., $d_{11}/d_{16}<8.0$). Thus, the multilayer capacitor C1 has the second outer portion 12 with a length sufficient for absorbing vibrations caused by the electrostrictive effect between the first and second outer portions 11, 12. Therefore, even when mounting the multilayer capacitor C1 to a board or the like such that the first main face L1a comes into contact with the board or the like, for example, the influence of the electrostrictive effect of the capacitor body L1 due to the voltage applied by the first and second inner electrodes 20, 30 is favorably restrained from propagating to the mounting board or the like. Hence, even when a voltage is applied to the multilayer capacitor C1 mounted on the board or the like, the sounding occurring in the board or the like is favorably suppressed.

In the multilayer capacitor C1, the length $d_{11}$ of the first terminal electrode 1 in the second direction is defined such that $d_{11}/d_{16}<8.0$. Therefore, even if the first terminal electrode 1 is pulled by the capacitor body L1 distorted by the electrostrictive effect, the region affecting the board or the like mounting the multilayer capacitor C1 can be reduced. As a result, even when vibrated and so forth under the influence of electrostrictive effect, the multilayer capacitor C L favorably restrains the vibration from being transmitted to the mounting board or the like.

In addition, the length $d_{11}$ of the first terminal electrode 1 in the second direction is defined such that $d_{11}/d_{16}>0.4$ in the multilayer capacitor C1. Therefore, the multilayer capacitor C1 can realize a favorable connection between the first terminal electrode 1 and a board or the like, while restraining the influence of the electrostrictive effect occurring in the multilayer capacitor C1 from propagating to the mounting board or the like. This allows the multilayer capacitor C1 to inhibit connection failures from occurring between the first terminal electrode 1 and the mounting board or the like.

Since the size of a multilayer capacitor is defined by a standard in general, its capacitance decreases as the size of the outer portion including no inner electrode increases. In the multilayer capacitor C1, by contrast, the length $d_{16}$ of the second outer portion 12 in the first direction is defined such that $d_{11}/d_{16} > 0.4$. Therefore, the multilayer capacitor C1 favorably restrains the capacitance from being reduced by the size of the second outer portion 12.

Though the first and second outer portions 11, 12 satisfy the expressions (1) and (2), respectively, one or both of the expressions (1) and (2) may be unsatisfied.

It will be more preferred if the ratio of the length of the second terminal electrode 2 in the second direction to the distance from the second inner electrode 30, which is the outermost inner electrode on the second main face L1b side in the plurality of first and second inner electrodes 20, 30 in the first direction, to the second main face L1b, which is the outer surface of the capacitor body L1 opposing the second inner electrode 30, is greater than 0.4 but smaller than 8.0. It will also be more preferred if the ratio of the length of the second terminal electrode 2 in the second direction to the distance from the first inner electrode 20, which is the outermost inner electrode on the first main face L1a side in the plurality of first and second inner electrodes 20, 30 in the first direction, to the first main face L1a, which is the outer surface of the capacitor body L1 opposing the first inner electrode 20, is greater than 0.4 but smaller than 8.0. This makes it possible to favorably restrain mechanical strains caused by the electrostrictive effect of the capacitor body L1 from propagating to the mounting board or the like through the second terminal electrode 2.

Second Embodiment

Figure 5:
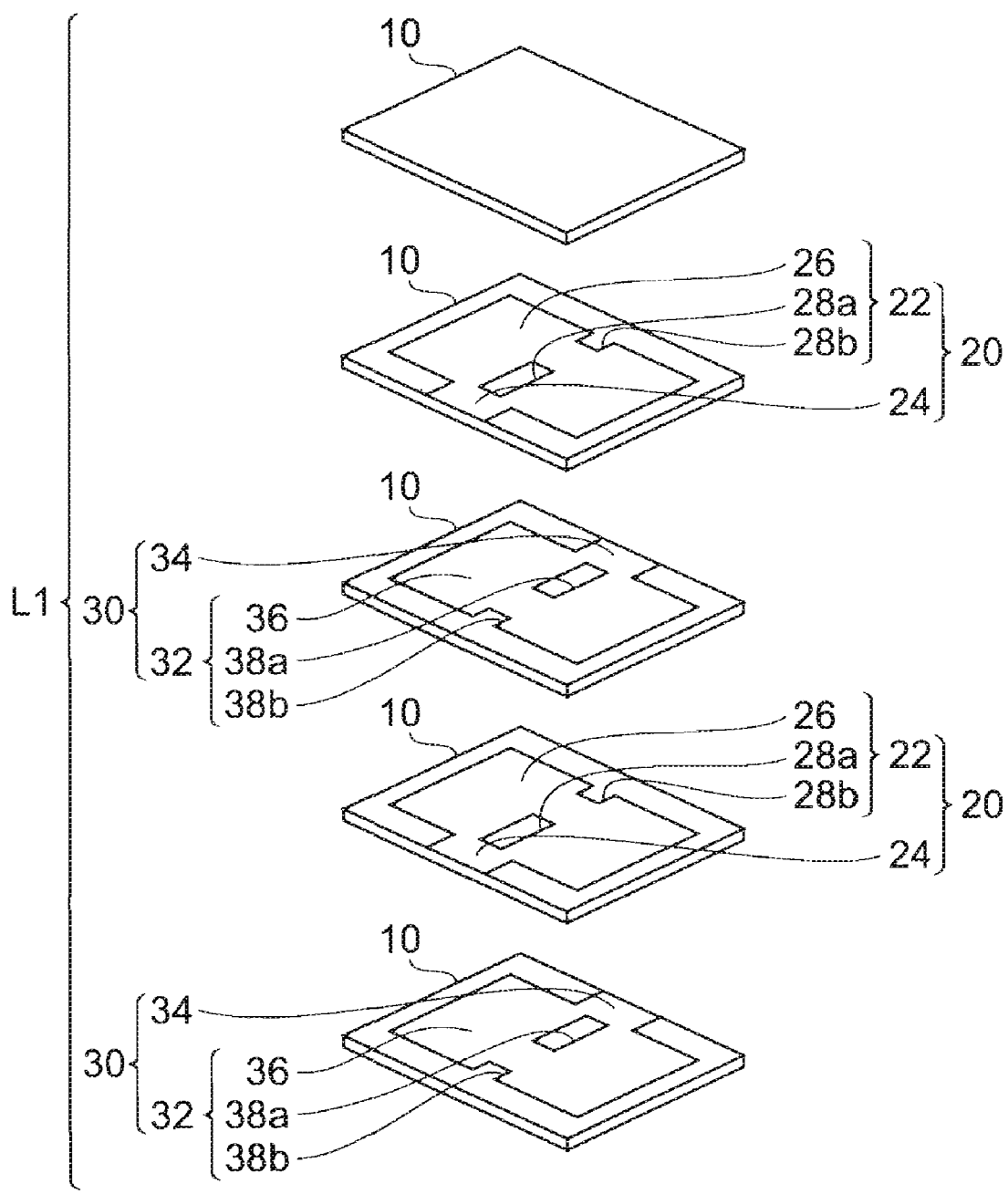
FIG. 5 is an exploded perspective view of the capacitor body included in the multilayer capacitor in accordance with the second embodiment.

With reference to FIG. 5, the multilayer capacitor in accordance with the second embodiment will be explained. The multilayer capacitor in accordance with the second embodiment differs from the multilayer capacitor C1 in accordance with the first embodiment in terms of the form of no-capacity generating regions included in main electrode portions of the first and second inner electrodes. FIG. 5 is an exploded perspective view of the capacitor body included in the multilayer capacitor in accordance with the second embodiment.

Though not depicted, the multilayer capacitor in accordance with the second embodiment comprises a capacitor body L1, a first terminal electrode 1, and a second terminal electrode 2 as with the multilayer capacitor C1 in accordance with the first embodiment. As shown in FIG. 5, the capacitor body L1 has a plurality (5 layers in this embodiment) of dielectric layers 10, a plurality (2 layers in this embodiment) of first inner electrodes 20, and a plurality (2 layers in this embodiment) of second inner electrodes 30.

Each first inner electrode 20 includes a main electrode portion 22 and a lead electrode portion 24. The main electrode portion 22 includes a capacity generating region 26 and a plurality of (2 in this embodiment) no-capacity generating regions 28a, 28b. The two no-capacity generating regions 28a, 28b are arranged in a row along the opposing direction of the first and second side faces L1c, L1d.

The capacity generating region 26 has a substantially rectangular form. The no-capacity generating region 28a is formed as a rectangular opening in the main electrode portion 22 of the first inner electrode 20. The no-capacity generating region 28a is formed such as to extend from the boundary portion between the main electrode portion 22 and the lead electrode portion 24 to the vicinity of the center of the capacity generating region 26 in the shorter-side direction of the first and second main faces L1a, L1b.

The no-capacity generating region 28b is formed like a slit. The no-capacity generating region 28b is formed such as to extend from the second side face L1d side to the first side face L1c side in the main electrode portion 22. However, the slit of the no-capacity generating region 28b does not reach the no-capacity generating region 28a. Both of the no-capacity generating regions 28a, 28b are positioned near the center of the main electrode portion 22 in the longer-side direction of the first and second main faces L1a, L1b.

The lead electrode portion 24 extends from the main electrode portion 22 so as to reach the first side face L1c. The lead electrode portion 24 is connected to the first terminal electrode 1 electrically and physically. Consequently, not only the main electrode portion 22 but also the first inner electrode 20 is electrically connected to the first terminal electrode 1. The lead electrode portion 24 is in contact with both of the capacity generating region 26 and no-capacity generating region 28a in the main electrode portion 22.

Each second inner electrode 30 includes a main electrode portion 32 and a lead electrode portion 34. The main electrode portion 32 includes a capacity generating region 36 and a plurality of (2 in this embodiment) no-capacity generating regions 38a, 38b.

The capacity generating region 36 has a substantially rectangular form. The no-capacity generating region 38a is formed as a rectangular opening in the main electrode portion 32 of the second inner electrode 30. The no-capacity generating region 38a is formed such as to extend from the boundary portion between the main electrode portion 32 and the lead electrode portion 34 to the vicinity of the center of the capacity generating region 36 in the shorter-side direction of the first and second main faces L1a, L1b.

The no-capacity generating region 38b is formed like a slit. The no-capacity generating region 38b is formed such as to extend from the first side face L1c side to the second side face L1d side in the main electrode portion 32. However, the slit of the no-capacity generating region 38b does not reach the no-capacity generating region 38a. Both of the no-capacity generating regions 38a, 38b are positioned near the center of the main electrode portion 32 in the longer-side direction of the first and second main faces L1a, L1b.

The lead electrode portion 34 extends from the main electrode portion 32 so as to reach the second side face L1d. The lead electrode portion 34 is connected to the second terminal electrode 2 electrically and physically. Consequently, not only the main electrode portion 32 but also the second inner electrode 30 is electrically connected to the second terminal electrode 2. The lead electrode portion 34 is in contact with both of the capacity generating region 36 and no-capacity generating region 38a in the main electrode portion 32.

Each pair of the first and second inner electrodes 20, 30 are arranged such that the capacity generating region 26 of the first inner electrode 20 and the capacity generating region 36 of the second inner electrode 30 oppose each other, with one dielectric layer 10 therebetween, which is at least portion of the capacitor body L1. Therefore, the capacity generating region 26 of the first inner electrode 20 cooperates with the capacity generating region 36 of the second inner electrode 30, so as to generate a capacitance.

Further, each pair of the first and second inner electrodes 20, 30 are arranged such that the no-capacity generating regions 28a, 28b of the first inner electrode 20 oppose the no-capacity generating regions 38a, 38b of the second inner electrode 30, respectively, with one dielectric layer 10 therebetween, which is at least portion of the capacitor body L1.

In a second direction which is parallel to the first side face L1c and orthogonal to the first direction, the length of the first terminal electrode 1 is set smaller than that of the first side face L1c in the second direction in the multilayer capacitor in accordance with the second embodiment. Further, the length of the lead electrode portion 24 of the first inner electrode 20 in the second direction is set smaller than that of the main electrode portion 22 of the first inner electrode 20 in the second direction.

In the first inner electrode 20, positions of the no-capacity generating regions 28a, 28b and lead electrode portion 24 in the first inner electrode 20 are set such that the no-capacity generating regions 28a, 28b overlap the lead electrode portion 24 in the second direction when seen in the first direction.

In a third direction which is parallel to the second side face L1d and orthogonal to the first direction, the length of the second terminal electrode 2 is set smaller than that of the second side face L1d in the third direction in the multilayer capacitor in accordance with the second embodiment. Further, the length of the lead electrode portion 34 of the second inner electrode 30 in the third direction is set smaller than that of the main electrode portion 32 of the second inner electrode 30 in the third direction.

In the second inner electrode 30, positions of the no-capacity generating regions 38a, 38b and lead electrode portion 34 in the second inner electrode 30 are set such that the no-capacity generating regions 38a, 38b overlap the lead electrode portion 34 in the third direction when seen in the first direction.

In the multilayer capacitor in accordance with the second embodiment, the main electrode portion 22 of the first inner electrode 20 includes the no-capacity generating regions 28a, 28b, which are arranged at such positions as to overlap the lead electrode portion 24 in the second direction when seen in the first direction. This reduces the influence on the first terminal electrode 1 caused by the electrostrictive effect of the capacitor body L1, whereby the multilayer capacitor in accordance with the second embodiment can also suppress mechanical strains caused by the electrostrictive effect near the first terminal electrode 1.

In the multilayer capacitor in accordance with the second embodiment, the main electrode portion 32 of the second inner electrode 30 also includes the no-capacity generating regions 38a, 38b, which are arranged at such positions as to overlap the lead electrode portion 34 in the third direction when seen in the first direction. This reduces the influence on the second terminal electrode 2 caused by the electrostrictive effect of the capacitor body L1, whereby the multilayer capacitor in accordance with the second embodiment can also suppress mechanical strains caused by the electrostrictive effect near the second terminal electrode 2.

Therefore, even when a voltage is applied to the multilayer capacitor in accordance with the second embodiment mounted on a board or the like, the sounding occurring in the board or the like is suppressed.

In the first inner electrode 20 in the multilayer capacitor in accordance with the second embodiment, the main electrode portion 22 and lead electrode portion 24 are in contact with each other while the no-capacity generating region 28a is arranged such as to come into contact with the boundary portion between the main electrode portion 22 and lead electrode portion 24. Therefore, the multilayer capacitor in accordance with the second embodiment can further suppress mechanical strains caused by the electrostrictive effect near the first terminal electrode 1.

In the second inner electrode 30 in the multilayer capacitor in accordance with the second embodiment, the main electrode portion 32 and lead electrode portion 34 are in contact with each other, while the no-capacity generating region 38a is arranged such as to come into contact with the boundary portion between the main electrode portion 32 and lead electrode portion 34. Therefore, the multilayer capacitor in accordance with the second embodiment can further suppress mechanical strains caused by the electrostrictive effect near the second terminal electrode 2 as well.

In the multilayer capacitor in accordance with the second embodiment, the first and second inner electrodes 20, 30 are arranged such that the no-capacity generating regions 28a, 28b of the first inner electrode 20 oppose the no-capacity generating regions 38a, 38b of the second inner electrode 30, respectively, with the dielectric layer 10 therebetween. Therefore, the multilayer capacitor in accordance with the second embodiment can efficiently restrain the capacitance from decreasing.

In addition, in the multilayer capacitor in accordance with the second embodiment in which the no-capacity generating regions 28a, 28b, 38a, 38b are formed such as to expose the dielectric layer 10, the no-capacity generating regions 28a, 28b oppose the no-capacity generating regions 38b, 38a, respectively. Therefore, the adhesion between the dielectric layer 10 and the first and second inner electrodes 20, 30 becomes favorable in the multilayer capacitor in accordance with the second embodiment.

By enhancing the interlayer adhesion in the capacitor body L1, the multilayer capacitor in accordance with the second embodiment can restrain the whole capacitor body L1 from being mechanically strained and further suppress the mechanical strains near the first and second terminal electrodes 1, 2.

In the multilayer capacitor in accordance with the second embodiment, the length of the first terminal electrode 1 is set smaller than that of the first side face L1c in the second direction. Therefore, even if the first terminal electrode 1 is pulled by the capacitor body L1 distorted by the electrostrictive effect, the region affecting the board or the like mounting the multilayer capacitor in accordance with the second embodiment can be reduced.

In the multilayer capacitor in accordance with the second embodiment, the length of the lead electrode portion 24 connecting with the first terminal electrode 1 is set smaller than that of the main electrode portion 22 in the second direction. This can reduce the length of the first terminal electrode 1 in the second direction.

In the multilayer capacitor in accordance with the second embodiment, the length of the second terminal electrode 2 is set smaller than that of the second side face L1d in the third direction. Therefore, even if the second terminal electrode 2 is pulled by the capacitor body L1 distorted by the electrostrictive effect, the region affecting the board or the like mounting the multilayer capacitor in accordance with the second embodiment can be reduced.

In the multilayer capacitor in accordance with the second embodiment, the length of the lead electrode portion 34 connecting with the second terminal electrode 2 is set smaller than that of the main electrode portion 32 in the third direction. This can reduce the length of the second terminal electrode 2 in the third direction.

Figure 6:
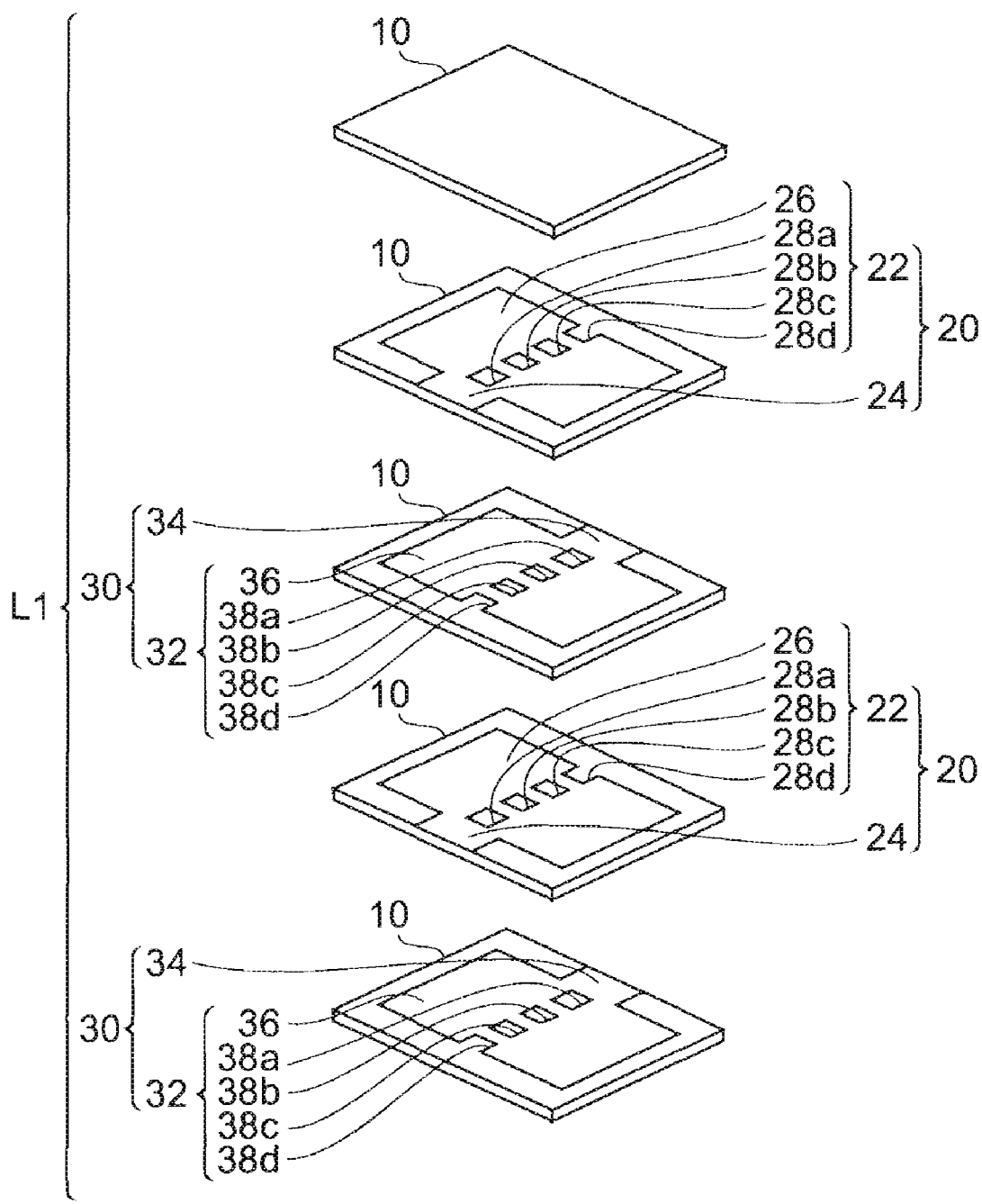
FIG. 6 is an exploded perspective view of the capacitor body included in the multilayer capacitor in accordance with a modified example of the second embodiment.

A modified example of this embodiment will now be explained with reference to FIG. 6. This modified example of the second embodiment differs from the multilayer capacitor in accordance with the second embodiment in terms of the number of no-capacity generating regions included in the main electrode portions of the first and second inner electrodes. FIG. 6 is an exploded perspective view of the capacitor body included in the multilayer capacitor in accordance with the modified example of the second embodiment.

Though not depicted, the multilayer capacitor in accordance with the modified example of the second embodiment comprises a capacitor body L1, a first terminal electrode 1, and a second terminal electrode 2 as with the above-mentioned multilayer capacitor C1 in accordance with the first embodiment. As shown in FIG. 6, the capacitor body 1 has a plurality of dielectric layers 10, a plurality of first inner electrodes 20, and a plurality of second inner electrodes 30.

The main electrode portion 22 of each first inner electrode 20 in accordance with the modified example of the second embodiment includes a capacity generating region 26 and four no-capacity generating regions 28a, 28b, 28c, 28d. The four no-capacity generating regions 28a, 28b, 28c, 28d are successively arranged from the first side face L1c side along the opposing direction of the first and second side faces L1c, L1d. All of the no-capacity generating regions 28a, 28b, 28c, 28d are positioned near the center of the main electrode portion 22 in the longer-side direction of the first and second main faces L1a, L1b.

The no-capacity generating region 28a is formed as a quadrangular opening in the main electrode portion 22 of the first inner electrode 20. The no-capacity generating region 28a extends from the boundary portion between the main electrode portion 22 and the lead electrode portion 24 toward the second side face L1d.

The no-capacity generating region 28b is formed as a quadrangular opening in the main electrode portion 22 of the first inner electrode 20. The no-capacity generating region 28b is formed nearer to the second side face L1d than is the no-capacity generating region 28a.

The no-capacity generating region 28c is formed as a quadrangular opening in the main electrode portion 22 of the first inner electrode 20. The no-capacity generating region 28c is formed nearer to the second side face L1d than are the no-capacity generating regions 28a, 28b.

The no-capacity generating region 28d is formed like a slit. The no-capacity generating region 28d is formed so as to extend from the second side face L1d side to the first side face 11c side in the main electrode portion 22. However, the slit of the no-capacity generating region 28d does not reach the no-capacity generating region 28c.

The lead electrode portion 24 extends from the main electrode portion 22 so as to reach the first side face L1c. The lead electrode portion 24 is connected to the first terminal electrode 1 electrically and physically. Consequently, not only the main electrode portion 22 but also the first inner electrode 20 is electrically connected to the first terminal electrode 1. The lead electrode portion 24 is in contact with both of the capacity generating region 26 and no-capacity generating region 28a in the main electrode portion 22.

The main electrode portion 32 of each second inner electrode 30 in accordance with the modified example of the second embodiment includes a capacity generating region 36 and four no-capacity generating regions 38a, 38b, 38c, 38d. The four no-capacity generating regions 38a, 38b, 38c, 38d are successively arranged from the second side face L1d side along the opposing direction of the first and second side faces L1c, L1d. All of the no-capacity generating regions 38a, 38b, 38c, 38d are positioned near the center of the main electrode portion 32 in the longer-side direction of the first and second main faces L1a, L1b.

The no-capacity generating region 38a is formed as a quadrangular opening in the main electrode portion 32 of the second inner electrode 30. The no-capacity generating region 38a extends from the boundary portion between the main electrode portion 32 and the lead electrode portion 34 toward the first side face L1c.

The no-capacity generating region 38b is formed as a quadrangular opening in the main electrode portion 32 of the first inner electrode 30. The no-capacity generating region 38b is formed nearer to the first side face L1c than is the no-capacity generating region 38a. The no-capacity generating region 38c is formed as a quadrangular opening in the main electrode portion 32 of the first inner electrode 30. The no-capacity generating region 38c is formed nearer to the first side face L1c than are the no-capacity generating regions 38a, 38b.

The no-capacity generating region 38d is formed like a slit. The no-capacity generating region 38d is formed so as to extend from the first side face L 1c side to the second side face L1d side in the main electrode portion 32. However, the slit of the no-capacity generating region 38d does not reach the no-capacity generating region 38c.

The lead electrode portion 34 extends from the main electrode portion 32 so as to reach the second side face L1d. The lead electrode portion 34 is connected to the second terminal electrode 2 electrically and physically. Consequently, not only the main electrode portion 32 but also the second inner electrode 30 is electrically connected to the second terminal electrode 2. The lead electrode portion 34 is in contact with both of the capacity generating region 36 and no-capacity generating region 38a in the main electrode portion 32.

Each pair of the first and second inner electrodes 20, 30 in the multilayer capacitor in accordance with the modified example of the second embodiment are arranged such that the no-capacity generating regions 28a, 28b, 28c, 28d of the first inner electrode 20 oppose the no-capacity generating regions 38d, 38c, 38b, 38a of the second inner electrode 30, respectively, with one dielectric layer 10 therebetween, which is at least portion of the capacitor body 1.

In the first inner electrode 20, positions of the no-capacity generating regions 28a, 28b, 28c, 28d and lead electrode portion 24 are set such that the no-capacity generating regions 28a, 28b, 28c, 28d overlap the lead electrode portion 24 in the second direction when seen in the first direction.

In the second inner electrode 30, positions of the no-capacity generating regions 38a, 38b, 38c, 38d and lead electrode portion 34 are set such that the no-capacity generating regions 38a, 38b, 38c, 38d overlap the lead electrode portion 34 in the third direction when seen in the first direction.

The multilayer capacitor in accordance with the modified example of the second embodiment can also suppress mechanical strains caused by the electrostrictive effect near the first terminal electrode 1. Further, it can suppress mechanical strains caused by the electrostrictive effect near the second terminal electrode 2.

In the multilayer capacitor in accordance with the modified example of the second embodiment, the first and second inner electrodes 20, 30 are arranged such that the no-capacity generating regions 28a, 28b, 28c, 28d of the first inner electrode 20 oppose the no-capacity generating regions 38d, 38c, 38b, 38a of the second inner electrode 30, respectively, with the dielectric layer 10 therebetween. This can efficiently restrain the capacitance from decreasing and make the interlayer adhesion favorable between the dielectric layer 10 and the first and second inner electrodes 20, 30.

In particular, the capacity generating region 26 among the no-capacity generating regions 28a, 28b, 28c, 28d of the first inner electrode 20 in the opposing direction of the first and second side faces L1c, L1d opposes the capacity generating region 36 of the second inner electrode 30 with the dielectric layer 10 interposed therebetween. The capacity generating region 36 among the no-capacity generating regions 38a, 38b, 38c, 38d of the second inner electrode 30 in the opposing direction of the first and second side faces L1c, L1d opposes the capacity generating region 26 of the first inner electrode 20 with the dielectric layer 10 interposed therebetween. Therefore, the multilayer capacitor in accordance with the modified example of the second embodiment can further efficiently restrain the capacitance from decreasing.

Even if the first or second terminal electrode 1, 2 is pulled by the capacitor body L1 distorted by the electrostrictive effect, the multilayer capacitor in accordance with the modified example of the second embodiment can reduce the region by which the first or second terminal electrode 1, 2 affects the mounting board or the like.

The multilayer capacitor in accordance with the second embodiment can also reduce the length of the first terminal electrode 1 in the second direction and the length of the second terminal electrode 2 in the third direction.

Third Embodiment

Figure 7:
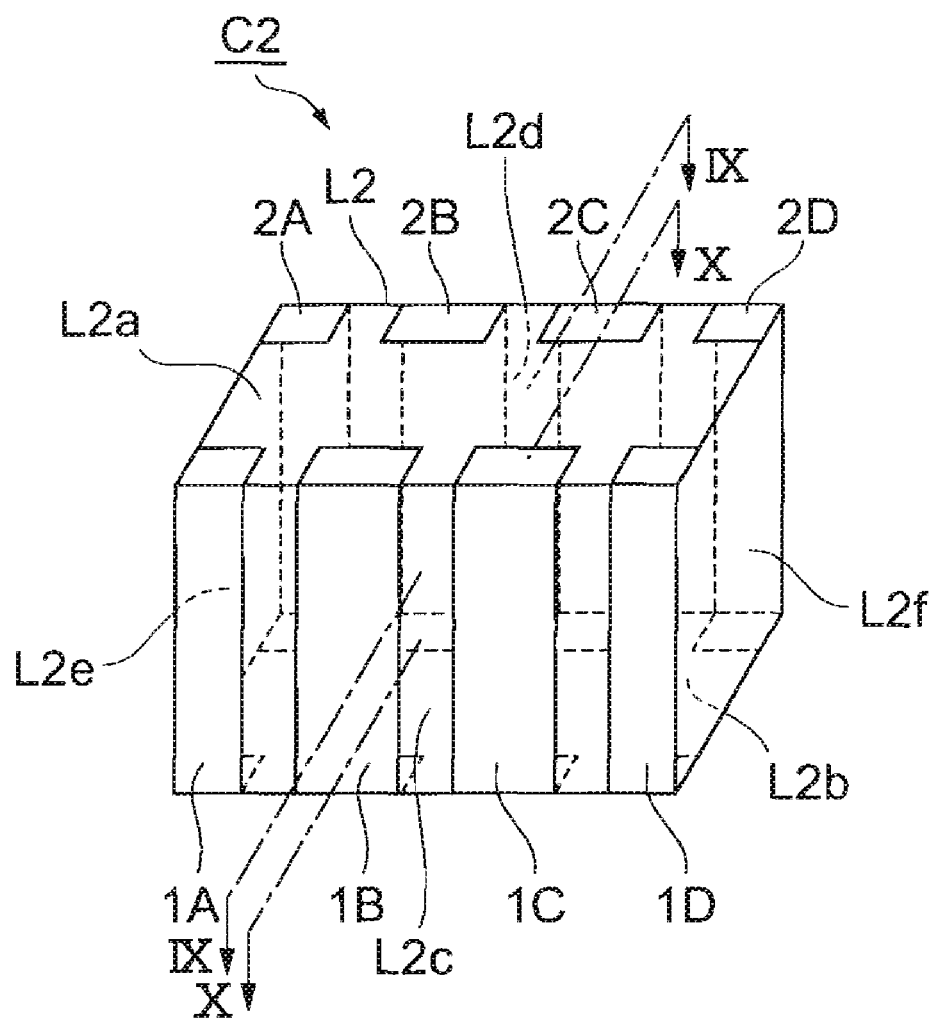
FIG. 7 is a perspective view of the multilayer capacitor in accordance with a third embodiment.
Figure 8:
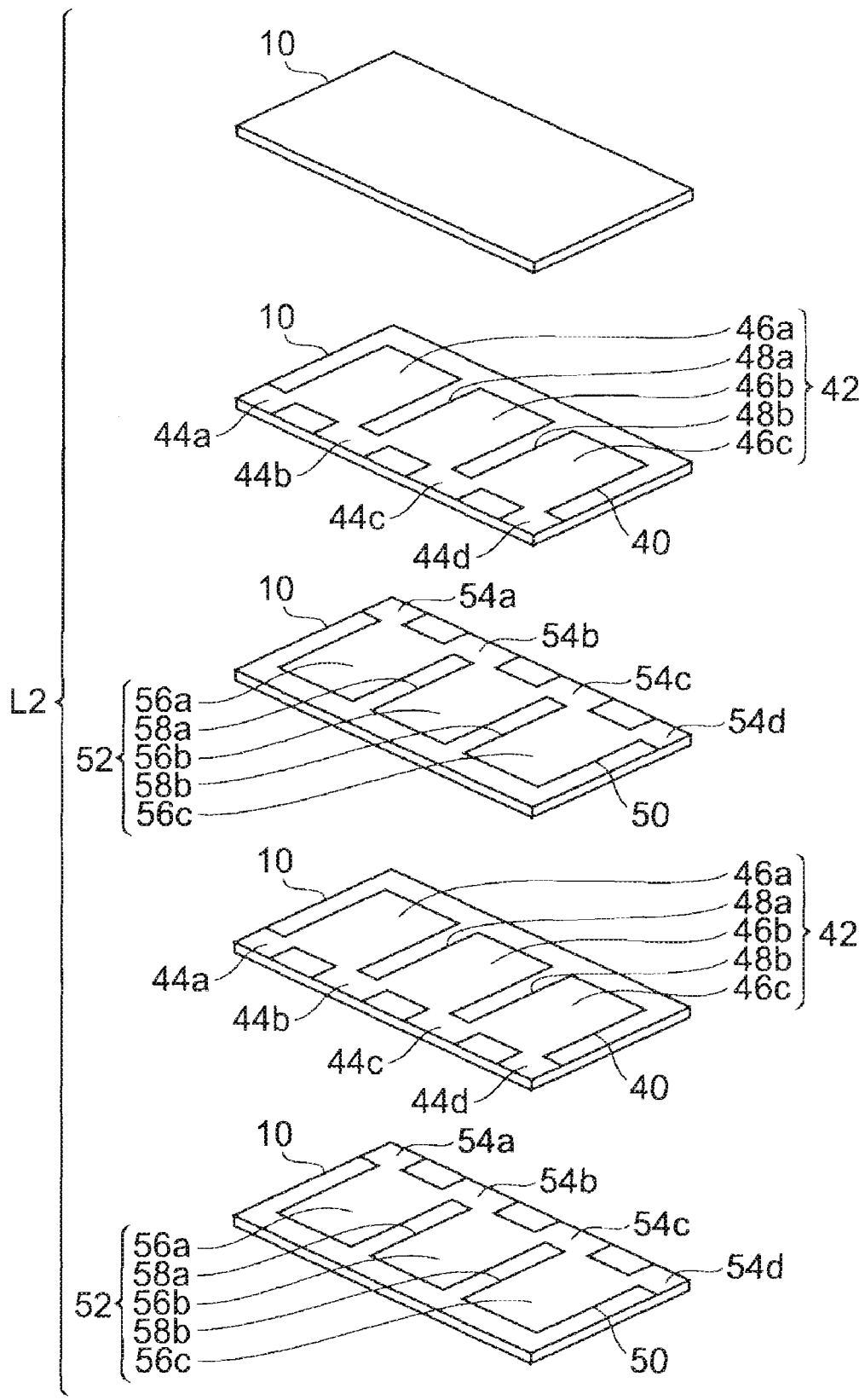
FIG. 8 is an exploded perspective view of the capacitor body included in the multilayer capacitor in accordance with the third embodiment.
Figure 9:
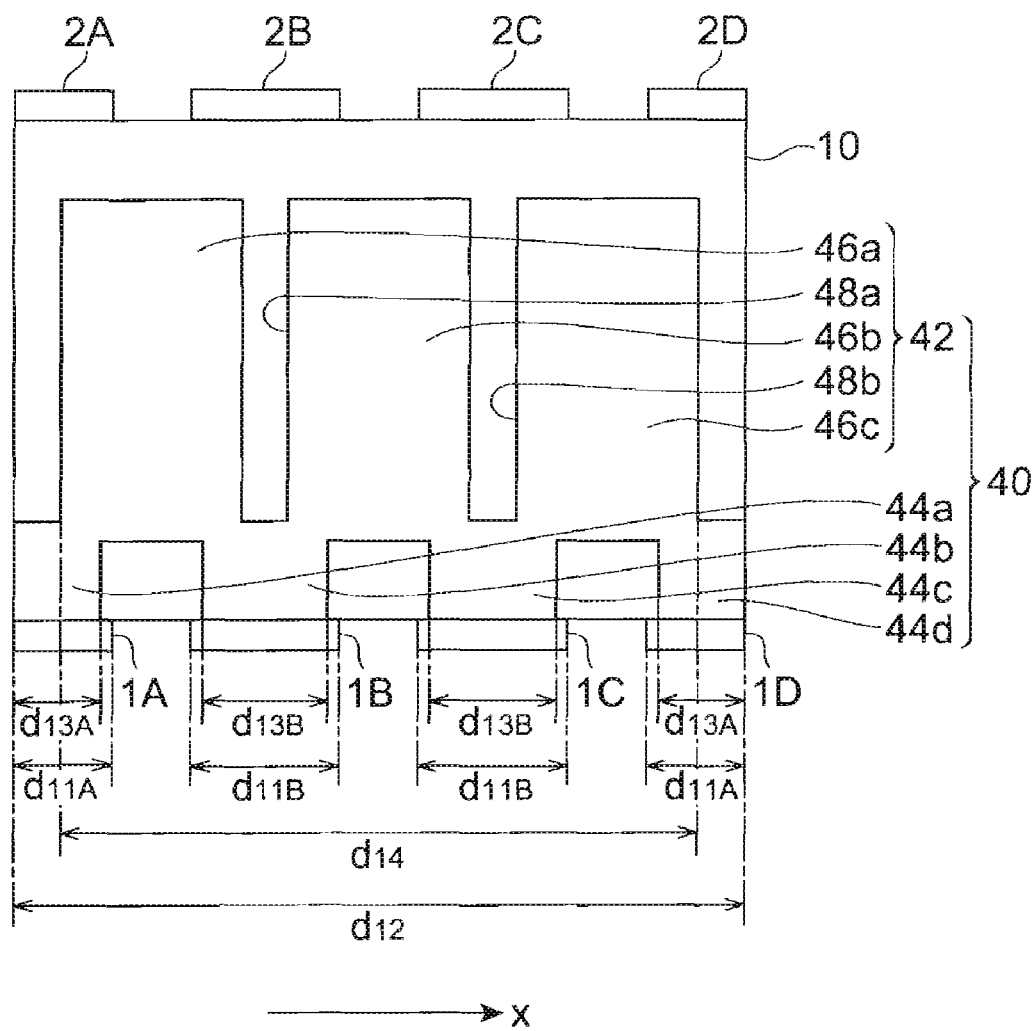
FIG. 9 is a view for explaining a cross-sectional structure of the multilayer capacitor in accordance with the third embodiment.
Figure 10:
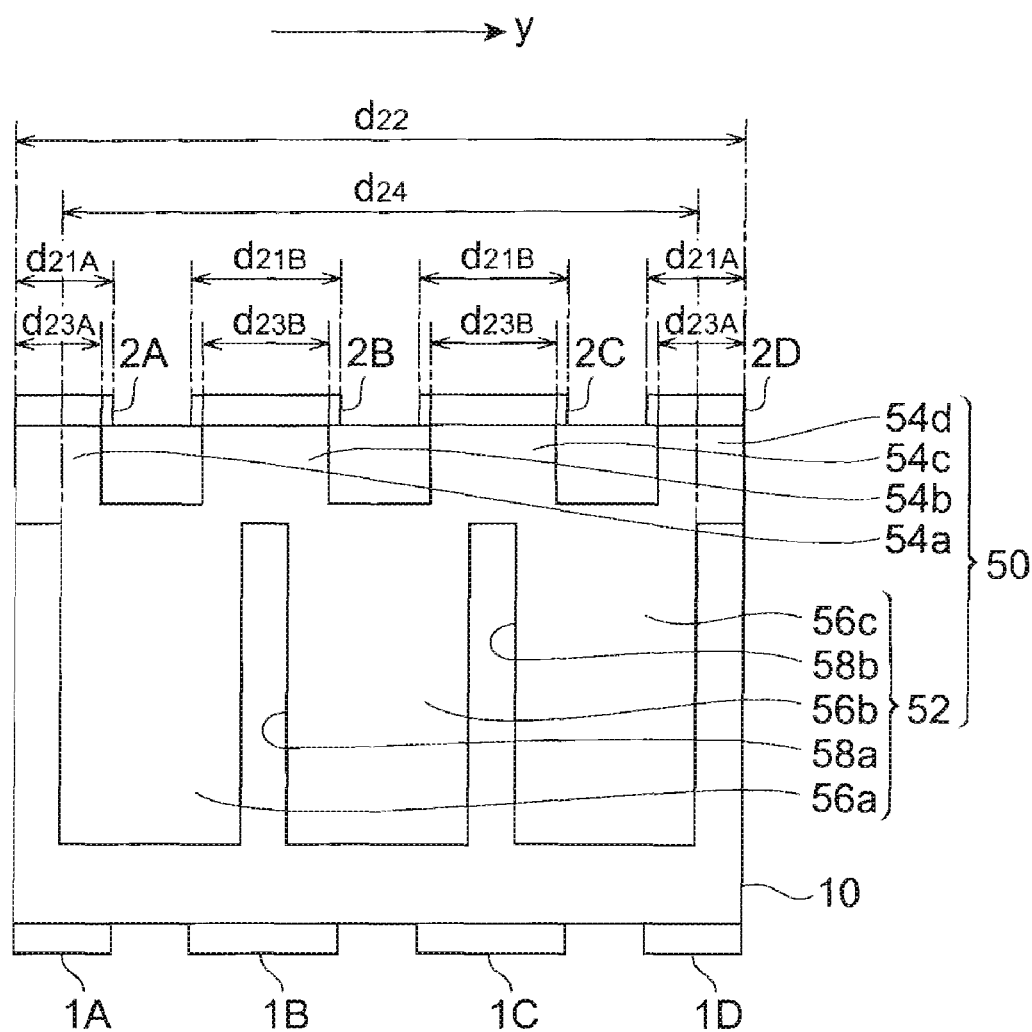
FIG. 10 is a view for explaining a cross-sectional structure of the multilayer capacitor in accordance with the third embodiment.

With reference to FIGS. 7 to 10, the structure of the multilayer capacitor C2 in accordance with the third embodiment will be explained. FIG. 7 is a perspective view of the multilayer capacitor in accordance with this embodiment. FIG. 8 is an exploded perspective view of the capacitor body included in the multilayer capacitor in accordance with this embodiment. FIG. 9 is a view for explaining a cross-sectional structure of the multilayer capacitor in accordance with this embodiment. FIG. 10 is a view for explaining a cross-sectional structure of the multilayer capacitor in accordance with this embodiment. The cross-sectional hatching is omitted in FIGS. 9 and 10.

As shown in FIG. 7, the multilayer capacitor C2 comprises a rectangular parallelepiped capacitor body L2, and first terminal electrodes 1A, 1B, 1C, 1D and second terminal electrodes 2A, 2B, 2C, 2D which are arranged on outer surfaces of the capacitor body L2. The capacitor body L2 includes rectangular first and second main faces L2a, L2b opposing each other, first and second side faces (first and second surfaces) L2c, L2d opposing each other, and third and fourth side faces L2e, L2f opposing each other. The first and second side faces L2c, L2d extend in the longer-side direction of the first and second main faces L2a, L2b so as to connect the first and second main faces L2a, L2b to each other. The third and fourth side faces L2e, L2f extend in the shorter-side direction of the first and second main faces L2a, L2b so as to connect the first and second main faces L2a, L2b to each other.

The first terminal electrodes 1A to 1D are arranged on the first side race L2c of the capacitor body L2. The first terminal electrodes 1A to 1D are successively arranged from the third side face L2e side on the first side face L2c. The first terminal electrodes 1A, 1D are placed at the respective ends facing the third and fourth side faces L2e, L2f on the first side face L2c.

The second terminal electrodes 2A to 2D are arranged on the second side face L2d of the capacitor body L2. The second terminal electrodes 2A to 2D are successively arranged from the third side face L2e side on the second side face L2d. The second terminal electrodes 2A, 2D are placed at the respective ends facing the third and fourth side faces L2e, L2f on the second side face L2d.

The first and second terminal electrodes 1A to 1D, 2A to 2D are formed, for example, by attaching and burning a conductive paste, which contains a conductive metal powder and a glass frit, onto outer surfaces of the capacitor body L2. A plating layer may be formed on the burned electrodes when necessary.

As shown in FIG. 8, the capacitor body L2 has a plurality (5 layers in this embodiment) of dielectric layers 10, a plurality (2 layers in this embodiment) of first inner electrodes 40, and a plurality (2 layers in this embodiment) of second inner electrodes 50. Therefore, the capacitor body L1 has a dielectric characteristic.

Each pair of the first inner electrode 40 and second inner electrode 50 are arranged such as to oppose each other with one dielectric layer 10 therebetween, which is a portion of the capacitor body L2. The first side face L2c arranged with the first terminal electrodes 1A to 1D and the second side face L2d arranged with the second terminal electrodes 2A to 2D are parallel to the opposing direction of the first and second inner electrodes 40, 50, i.e., a first direction.

The first inner electrode 40 includes a main electrode portion 42 and lead electrode portions 44a, 44b, 44c, 44d. The main electrode portion 42 includes capacity generating regions 46a, 46b, 46c and no-capacity generating regions 48a, 48b. The first inner electrode 40 is constituted by a sintered body of a conductive paste.

The capacity generating regions 46a to 46c, each having a rectangular form, are arranged in a row along the longer-side direction of the first and second main faces L2a, L2b.

The no-capacity generating region 48a is formed as a slit extending from the second side face L2d side to the first side face L2c side in the main electrode portion 42, so as to be positioned between the capacity generating regions 46a, 46b. The no-capacity generating region 48b is formed as a slit extending from the second side face L2d side to the first side face L2c side in the main electrode portion 42, so as to be positioned between the capacity generating regions 46b, 46c.

No sintered body of the conductive paste exists in the slit-shaped no-capacity generating regions 48a, 48b, whereby the no-capacity generating regions 48a, 48b do not contribute to generating a capacitance.

The lead electrode portion 44a extends from the capacity generating region 46a of the main electrode portion 42 so as to reach the first side face L2c. The lead electrode portion 44a is connected to the first terminal electrode 1A electrically and physically. Consequently, not only the capacity generating region 46a of the main electrode portion 42 but also the first inner electrode 40 is electrically connected to the first terminal electrode 1A.

The lead electrode portion 44b extends from the capacity generating regions 46a, 46b and no-capacity generating region 48a of the main electrode portion 42 so as to reach the first side face L2c. The lead electrode portion 44b is connected to the first terminal electrode 1B electrically and physically. Consequently, not only the capacity generating regions 46a, 46b of the main electrode portion 42 but also the first inner electrode 40 is electrically connected to the first terminal electrode 1B.

The lead electrode portion 44c extends from the capacity generating regions 46b, 46c and no-capacity generating region 48b of the main electrode portion 42 so as to reach the first side face L2c. The lead electrode portion 44c is connected to the first terminal electrode 1C electrically and physically. Consequently, not only the capacity generating regions 46b, 46c of the main electrode portion 42 but also the first inner electrode 40 is electrically connected to the first terminal electrode 1C.

The lead electrode portion 44d extends from the capacity generating region 46d of the main electrode portion 42 so as to reach the first side face L2c. The lead electrode portion 44d is connected to the first terminal electrode 1D electrically and physically. Consequently, not only the capacity generating region 46d of the main electrode portion 42 but also the first inner electrode 40 is electrically connected to the first terminal electrode 1D.

The lead electrode portion 44a is in contact with the capacity generating region 46a of the main electrode portion 42. The lead electrode portion 44b is in contact with all of the capacity generating regions 46a, 46b and no-capacity generating region 48b of the main electrode portion 42. The lead electrode portion 44c is in contact with all of the capacity generating regions 46b, 46c and no-capacity generating region 48b of the main electrode portion 42. The lead electrode portion 44d is in contact with the capacity generating region 46c of the main electrode portion 42.

The no-capacity generating region 48a is arranged such as to come into contact with the boundary portion between the lead electrode portion 44b and the capacity generating regions 46a, 46b of the main electrode portion 42. The no-capacity generating region 48b is arranged such as to come into contact with the boundary portion between the lead electrode portion 44c and the capacity generating regions 46b, 46c of the main electrode portion 42.

The second inner electrode 50 includes a main electrode portion 52 and lead electrode portions 54a, 54b, 54c, 54d. The main electrode portion 52 includes capacity generating regions 56a, 56b, 56c and no-capacity generating regions 58a, 58b. The second inner electrode 50 is constituted by a sintered body of a conductive paste.

The capacity generating regions 56a to 56c, each having a rectangular form, are arranged in a row along the longer-side direction of the first and second main faces L2a, L2b.

The no-capacity generating region 58a is formed as a slit extending from the first side face L2c side to the second side face L2d side in the main electrode portion 52, so as to be positioned between the capacity generating regions 56a, 56b. The no-capacity generating region 58b is formed as a slit extending from the first side face L2c side to the second side face L2d side in the main electrode portion 52, so as to be positioned between the capacity generating regions 56b, 56c.

No sintered body of the conductive paste exists in the slit-shaped no-capacity generating regions 58a, 58b, whereby the no-capacity generating regions 58a, 58b do not contribute to generating a capacitance.

The lead electrode portion 54a extends from the capacity generating region 56a of the main electrode portion 52 so as to reach the second side face L2d. The lead electrode portion 54a is connected to the second terminal electrode 2A electrically and physically. Consequently, not only the capacity generating region 56a of the main electrode portion 52 but also the second inner electrode 50 is electrically connected to the second terminal electrode 2A.

The lead electrode portion 54b extends from the capacity generating regions 56a, 56b and no-capacity generating region 58a of the main electrode portion 52 so as to reach the second side face L2d. The lead electrode portion 54b is connected to the second terminal electrode 2B electrically and physically. Consequently, not only the capacity generating regions 56a, 56b of the main electrode portion 52 but also the second inner electrode 50 is electrically connected to the second terminal electrode 2B.

The lead electrode portion 54c extends from the capacity generating regions 56b, 56c and no-capacity generating region 58b of the main electrode portion 52 so as to reach the second side face L2d. The lead electrode portion 54c is connected to the second terminal electrode 2C electrically and physically. Consequently, not only the capacity generating regions 56b, 56c of the main electrode portion 52 but also the second inner electrode 50 is electrically connected to the second terminal electrode 2C.

The lead electrode portion 54d extends from the capacity generating region 56d of the main electrode portion 52 so as to reach the second side face L2d. The lead electrode portion 54d is connected to the second terminal electrode 2D electrically and physically. Consequently, not only the capacity generating region 56d of the main electrode portion 52 but also the second inner electrode 50 is electrically connected to the second terminal electrode 2D.

The lead electrode portion 54a is in contact with the capacity generating region 56a of the main electrode portion 52. The lead electrode portion 54b is in contact with all of the capacity generating regions 56a, 56b and no-capacity generating region 58a of the main electrode portion 52. The lead electrode portion 54c is in contact with all of the capacity generating regions 56b, 56c and no-capacity generating region 58b of the main electrode portion 52. The lead electrode portion 54d is in contact with the capacity generating region 56c of the main electrode portion 52.

The no-capacity generating region 58a is arranged such as to come into contact with the boundary portion between the lead electrode portion 54b and the capacity generating regions 56a, 56b of the main electrode portion 52. The no-capacity generating region 58b is arranged such as to come into contact with the boundary portion between the lead electrode portion 54c and the capacity generating regions 56b, 56c of the main electrode portion 52.

Each pair of the first and second inner electrodes 40, 50 are arranged such that the capacity generating regions 46a, 46b, 46c of the first inner electrode 40 oppose the capacity generating regions 56a, 56b, 56c of the second inner electrode 50, respectively, with one dielectric layer 10 therebetween, which is at least portion of the capacitor body L2. Therefore, the capacity generating regions 46a to 46c of the first inner electrode 40 cooperate with the capacity generating regions 56a to 56c of the second inner electrode 50, so as to generate a capacitance.

Each pair of the first and second inner electrodes 40, 50 are also arranged such that the no-capacity generating regions 48a, 48b of the first inner electrode 40 oppose the no-capacity generating regions 58a, 58b of the second inner electrode 50, respectively, with one dielectric layer 10 therebetween, which is at least portion of the capacitor body L2.

A direction parallel to the first side face L2c and orthogonal to the first direction will now be referred to as a second direction. In FIG. 9, the second direction is represented as x direction. FIG. 9 is a view schematically showing a cross section of the multilayer capacitor taken along the line IX-IX of FIG. 7, cut at a position where the upper face of the first inner electrode 40 and the dielectric layer 10 are laminated.

As shown in FIG. 9, each of the respective lengths $d_{11A}$, $d_{11B}$, $d_{11C}$, $d_{11D}$ of the first terminal electrodes 1A, 1B, 1C, 1D in the second direction is set smaller than the length $d_{12}$ of the first side face L2c in the second direction. Namely, $d_{11X(11X=11A, 11B, 11C, 11D)} < d_{12}$. Further, as shown in FIG. 9, each of the respective lengths ($d_{13A}$, $d_{13B}$, $d_{13C}$, $d_{13D}$) of the lead electrode portions 44a, 44b, 44c, 44d of the first inner electrode 40 in the second direction is set smaller than the length $d_{14}$ of the main electrode portion 42 of the first inner electrode 40 in the second direction. Namely, $d_{13X(13X=13A, 13B, 13C, 13D)} < d_{14}$.

In the first inner electrode 40, positions of the no-capacity generating region 48a and lead electrode portion 44b are set such that the no-capacity generating region 48a and lead electrode portion 44b overlap each other in the second direction (x direction) when seen in the first direction, i.e., in the sectional view of FIG. 9. Further, in the first inner electrode 40, positions of the no-capacity generating region 48b and lead electrode portion 44c are set such that the no-capacity generating region 48b and lead electrode portion 44c overlap each other in the second direction (x direction) when seen in the first direction.

A direction parallel to the second side face L2d and orthogonal to the first direction will now be referred to as a third direction. In FIG. 10, the third direction is represented as y direction. FIG. 10 is a view schematically showing a cross section of the multilayer capacitor taken along the line X-X of FIG. 7, cut at a position where the upper face of the first inner electrode 40 and the dielectric layer 10 are laminated.

As shown in FIG. 10, each of the respective lengths $d_{21A}$, $d_{21B}$, $d_{21C}$, $d_{21D}$ of the second terminal electrodes 2A, 2B, 2C, 2D in the third direction is set smaller than the length $d_{22}$ of the second side face L2d in the third direction. Namely, $d_{21X(21X=21A, 21B, 21C, 21D)} < d_{22}$. Further, as shown in FIG. 10, each of the respective lengths $d_{23A}$, $d_{23B}$, $d_{23C}$, $d_{23D}$ of the lead electrode portions 54a, 54b, 54c, 54d of the second inner electrode 50 in the second direction is set smaller than the length $d_{24}$ of the main electrode portion 52 of the second inner electrode 50 in the third direction. Namely, $d_{23X(23X=23A, 23B, 23C, 23D)} < d_{24}$.

In the second inner electrode 50, positions of the no-capacity generating region 58a and lead electrode portion 54b are set such that the no-capacity generating region 58a and lead electrode portion 54b overlap each other in the third direction (y direction) when seen in the first direction, i.e., in the sectional view of FIG. 10. Further, in the second inner electrode 50, positions of the no-capacity generating region 58b and lead electrode portion 54c are set such that the no-capacity generating region 58b and lead electrode portion 54c overlap each other in the third direction (y direction) when seen in the first direction.

In the multilayer capacitor C2, the main electrode portion 42 of the first inner electrode 40 includes the no-capacity generating regions 48a, 48b. Therefore, even when a voltage is applied to the multilayer capacitor C2 by connecting the terminal electrodes 1A to 1D, 2A to 2D to land electrodes or the like of a board, so that the voltage is applied between the first and second inner electrodes 40, 50, the voltage imparted to the slit-shaped no-capacity generating regions 48a, 48b in the main electrode portion 42 is suppressed. In addition, the no-capacity generating regions 48a, 48b are arranged at such positions as to overlap the lead electrode portion 44b, 44c, respectively, in the second direction (x direction in FIG. 9) when seen in the first direction. As can be understood from the foregoing, the effect of electrostriction of the capacitor body L2 affecting the lead electrode portions 44a to 44d (the lead electrode portions 44b, 44c in particular) is reduced in proportion to the no-capacity generating regions 48a, 48b. This lowers the influence on the first terminal electrodes 1A to 1D caused by the electrostrictive effect of the capacitor body L2, whereby the multilayer capacitor C2 can suppress the mechanical strain caused by the electrostrictive effect near the first terminal electrodes.

In the multilayer capacitor C2, the main electrode portion 52 of the second inner electrode 50 also includes the no-capacity generating regions 58a, 58b, which are arranged at such positions as to overlap the lead electrode portions 54b, 54c, respectively, in the third direction (y direction in FIG. 10). This lowers the influence on the second terminal electrodes 2A to 2D caused by the electrostrictive effect of the capacitor body L2, whereby the multilayer capacitor C2 can also suppress the mechanical strain caused by the electrostrictive effect near the second terminal electrodes.

Therefore, even when a voltage is applied to the multilayer capacitor C2 mounted on a board or the like, the sounding occurring in the board or the like is suppressed.

As the no-capacity generating region is nearer to a lead electrode portion, the influence on a terminal electrode caused by the electrostrictive effect of the capacitor body becomes smaller. In the first inner electrode 40 in the multilayer capacitor C2, the main electrode portion 42 is in contact with the lead electrode portions 44a to 44d, while the no-capacity generating region 48a is arranged such as to come into contact with the boundary portion between the main electrode portion 42 and lead electrode portion 44c. Therefore, the multilayer capacitor C2 can further suppress the mechanical strain caused by the electrostrictive effect near the first terminal electrodes.

In the second inner electrode 50 of the multilayer capacitor C2, the main electrode portion 52 is in contact with the lead electrode portions 54a to 54d, while the no-capacity generating regions 58a, 58b are arranged such as to come into contact with the boundary portion between the main electrode portion 52 and lead electrode portion 54b and the boundary portion between the main electrode portion 52 and lead electrode portion 54c, respectively. Therefore, the multilayer capacitor C2 can further suppress the mechanical strain caused by the electrostrictive effect near the second terminal electrodes as well.

In the multilayer capacitor C2, the first and second inner electrodes 40, 50 are arranged such that the no-capacity generating regions 48a, 48b of the first inner electrode 40 oppose the no-capacity generating regions 58a, 58b of the second inner electrode 50, respectively, with the dielectric layer 10 therebetween. Therefore, the multilayer capacitor C2 can efficiently restrain the capacitance from decreasing and make the interlayer adhesion favorable between the dielectric layer 10 and the first and second inner electrodes 40, 50.

Since the interlayer adhesion is favorable in the capacitor body L2, the multilayer capacitor C2 can restrain the whole capacitor body L2 from being mechanically strained and further suppress the mechanical strains near the first and second terminal electrodes 1A to 1D, 2A to 2D.

In the multilayer capacitor C2, each of the lengths $d_{11A}$ to $d_{11D}$ of the first terminal electrodes 1A to 1D is set smaller than the length $d_{12}$ of the first side face L2c in the second direction. Therefore, even if the first terminal electrodes 1A to 1D are pulled by the capacitor body L2 distorted by the electrostrictive effect, the region affecting a board or the like mounting the multilayer capacitor C2 can be reduced.

In the multilayer capacitor C2, each of the lengths $d_{13A}$ to $d_{13D}$ of the lead electrode portions 44a to 44d connecting with the first terminal electrodes 1A to 1D is set smaller than the length $d_{14}$ of the main electrode portion 42 in the second direction. This can reduce the lengths $d_{11A}$ to $d_{11D}$ of the first terminal electrodes 1A to 1D in the second direction.

In the multilayer capacitor C2, each of the lengths $d_{21A}$ to $d_{21D}$) of the second terminal electrodes 2A to 2D is set smaller than the length $d_{22}$ of the second side face L2d in the third direction. Therefore, even if the second terminal electrodes 2A to 2D are pulled by the capacitor body L2 distorted by the electrostrictive effect, the region affecting a board or the like mounting the multilayer capacitor C2 can be reduced.

In the multilayer capacitor C2, each of the lengths $d_{23A}$ to $d_{23D}$ of the lead electrode portions 54a to 54d connecting with the second terminal electrodes 2A to 2D is set smaller than the length $d_{24}$ of the main electrode portion 52 in the third direction. This can reduce the lengths $d_{21A}$ to $d_{21D}$ of the second terminal electrodes 2A to 2D in the third direction.

Though preferred embodiments of the present invention are explained in the foregoing, the present invention is not necessarily limited to the above-mentioned embodiments and can be modified in various ways within the scope not deviating from the gist thereof.

For example, the numbers of laminations of dielectric layers 10 and inner electrodes 20, 40, 30, 50 and the numbers of terminal electrodes 1, 1A to 1D, 2, 2A to 2D are not limited to those in the above-mentioned embodiments and modified example.

The forms of the capacity generating regions 26, 26a, 26b, 46a to 46c, 36, 36a, 36c, 56a to 56c and no-capacity generating regions 28, 28a to 28d, 48a, 48b, 38, 38a to 38d, 58a, 58b in the inner electrodes 20, 40, 30, 50 are not limited to those in the above-mentioned embodiments and modified example. The numbers of the capacity generating regions 26, 26a, 26b, 46a to 46c, 36, 36a, 36c, 56a to 56c and no-capacity generating regions 28, 28a to 28d, 48a, 48b, 38, 38a to 38d, 58a, 58b included in the main electrode portions 22, 42, 32, 52 in the inner electrodes 20, 40, 30, 50 are not limited to those in the above-mentioned embodiments and modified example.

It is not necessary for the no-capacity generating regions 28, 28a to 28d, 48a, 48b, 38, 38a to 38d, 58a, 58b in the inner electrodes 20, 40, 30, 50 to be in contact with the boundary portions between the main electrode portions 22, 42, 32, 52 and the lead electrode portions 24, 34, 44a to 44d, 54a to 54d. It is not necessary for the no-capacity generating regions 28, 28a to 28d, 48a, 48b of the first inner electrodes 20, 40 to oppose the no-capacity generating regions 38, 38a to 38d, 58a, 58b of the second inner electrodes 30, 50 in the first direction.

One of the first and second inner electrodes 20, 40, 30, 50 (first inner electrode) may include a no-capacity generating region instead of both.

In the multilayer capacitors in accordance with the second and third embodiments, the ratio of the length of each of the first terminal electrodes 1, 1A to 1D in the first direction to the distance from the outermost inner electrode 30, 50 on the second main face L1b, L2b side in the first direction in the plurality of first and second inner electrodes 20, 40, 30, 50 to the second main face L1b, L2b of the capacitor body L1, L2 opposing the inner electrode 30, 50 may be greater than 0.4 but smaller than 8.0. Also, in the multilayer capacitors in accordance with the second and third embodiments, the ratio of the length of each of the first terminal electrodes 1, 1A to 1D in the first direction to the distance from the outermost inner electrode 20, 40 on the first main face L1a, L2a side in the first direction in the plurality of first and second inner electrodes 20, 40, 30, 50 to the first main face L1a, L2a of the capacitor body L1, L2 opposing the inner electrode 20, 40 may be greater than 0.4 but smaller than 8.0.

In the multilayer capacitors in accordance with the second and third embodiments, the ratio of the length of each of the second terminal electrodes 2, 2A to 2D in the second direction to the distance from the outermost inner electrode 30, 50 on the second main face L1b, L2b side in the first direction in the plurality of first and second inner electrodes 20, 40, 30, 50 to the second main face L1b, L2b of the capacitor body L1, L2 opposing the inner electrode 30, 50 may be greater than 0.4 but smaller than 8.0. Also, in the multilayer capacitors in accordance with the second and third embodiments, the ratio of the length of each of the second terminal electrodes 2, 2A to 2D in the second direction to the distance from the outermost inner electrode 20, 40 on the first main face L1a, L2a side in the first direction in the plurality of first and second inner electrodes 20, 40, 30, 50 to the first main face L1a, L2a of the capacitor body L1, L2 opposing the inner electrode 20, 40 may be greater than 0.4 but smaller than 8.0.

These make it possible to favorably restrain mechanical strains caused by the electrostrictive effect of the capacitor body L1, L2 from propagating to the mounting board or the like through the first or second terminal electrodes 1, 1A, 2, 2A to 2D.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a capacitor body having a dielectric characteristic;
   first and second inner electrodes arranged in the capacitor body so as to oppose each other in a first direction with at least portion of the capacitor body therebetween;
   a first terminal electrode arranged on a first surface out of outer surfaces of the capacitor body and connected to the first inner electrode, the first surface being parallel to the first direction; and
   a second terminal electrode arranged on an outer surface of the capacitor body and connected to the second inner electrode;
   wherein the first inner electrode has a first main electrode portion including a first no-capacity generating region noncontributory to generating a capacitance and a first capacity generating region cooperating with the second inner electrode so as to generate a capacitance, and a first lead electrode portion connecting the first main electrode portion to the first terminal electrode;
   wherein, in a second direction parallel to the first surface and orthogonal to the first direction, the first terminal electrode has a length set smaller than that of the first surface, while the first lead electrode portion has a length set smaller than that of the first main electrode portion;
   wherein the first no-capacity generating region and the first lead electrode portion overlap each other in the second direction when seen in the first direction;
   wherein the second terminal electrode is arranged on a second surface parallel to the first direction out of the outer surfaces of the capacitor body;
   wherein the second inner electrode has a second main electrode portion including a second no-capacity generating region noncontributory to generating a capacitance and a second capacity generating region cooperating with the first inner electrode so as to generate a capacitance, and a second lead electrode portion connecting the second main electrode portion to the second terminal electrode;
   wherein in a third direction parallel to the second surface and orthogonal to the first direction, the second terminal electrode has a length set smaller than that of the second surface, while the second lead electrode portion of the second inner electrode has a length set smaller than that of the second main electrode portion of the second inner electrode;

wherein the second no-capacity generating region of the second inner electrode and the second lead electrode portion of the second inner electrode overlap each other in the third direction when seen in the first direction;

wherein the first and second inner electrodes are arranged such that the first no-capacity generating region of the first inner electrode and the second no-capacity generating region of the second inner electrode oppose each other with at least a portion of the capacitor body therebetween; and wherein the first and second no-capacity generating regions extend to a direction in which the first and second surface oppose each other so that the first and second main electrode portions are divided completely in the second and third directions, when seen the first and second internal electrode overlap each other in the first direction.

2. A multilayer capacitor according to claim 1, wherein the first main electrode portion and the first lead electrode portion are in contact with each other in the first inner electrode; and wherein the first no-capacity generating region is arranged so as to come into contact with a boundary portion between the first main electrode portion and the first lead electrode portion.

3. A multilayer capacitor according to claim 1, wherein the first no-capacity generating region is formed like an opening in the first main electrode portion of the first inner electrode.

4. A multilayer capacitor according to claim 1, wherein the first no-capacity generating region is formed like a slit in the first main electrode portion of the first inner electrode.

5. A multilayer capacitor according to claim 1, wherein a plurality of first inner electrodes and a plurality of second inner electrodes are alternately arranged along the first direction; and wherein the ratio of the length of the first terminal electrode in the second direction to the distance between an outermost inner electrode in the first direction in the first and second inner electrodes and the outer surface of the capacitor body opposing the outermost inner electrode is greater than 0.4 but smaller than 8.0.

6. A multilayer capacitor according to claim 1, wherein the second main electrode portion and the second lead electrode portion are in contact with each other in the second inner electrode; and wherein the second no-capacity generating region is arranged so as to come into contact with a boundary portion between the second main electrode portion and the second lead electrode portion.

7. A multilayer capacitor according to claim 1, wherein the second no-capacity generating region is formed like an opening in the second main electrode portion of the second inner electrode.

8. A multilayer capacitor according to claim 1, wherein the second no-capacity generating region is formed like a slit in the second main electrode portion of the second inner electrode.

* * * * *